US009353927B2

(12) United States Patent
Ishida et al.

(10) Patent No.: US 9,353,927 B2
(45) Date of Patent: May 31, 2016

(54) LIGHTING APPARATUS

(71) Applicants: Toshiba Lighting & Technology Corporation, Yokosuka-shi, Kanagawa-ken (JP); Kabushiki Kaisha Toshiba, Minato-ku, Tokyo (JP)

(72) Inventors: Toshiyuki Ishida, Yokosuka (JP); Akimichi Takahashi, Yokosuka (JP); Hirokazu Yamada, Yokosuka (JP); Makoto Kawagoe, Yokosuka (JP); Hiroyuki Kuramochi, Yokosuka (JP)

(73) Assignees: Toshiba Lighting & Technology Corporation, Yokosuka-shi, Kanagawa-ken (JP); Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 14/336,362

(22) Filed: Jul. 21, 2014

(65) Prior Publication Data

US 2014/0328068 A1 Nov. 6, 2014

Related U.S. Application Data

(63) Continuation of application No. 13/045,812, filed on Mar. 11, 2011, now Pat. No. 8,814,396.

(30) Foreign Application Priority Data

Mar. 29, 2010 (JP) ................................ 2010-075519
Oct. 19, 2010 (JP) ................................ 2010-234909
Feb. 17, 2011 (JP) ................................ 2011-032546

(51) Int. Cl.
*B60Q 1/06* (2006.01)
*F21V 5/04* (2006.01)
(Continued)

(52) U.S. Cl.
CPC . *F21V 5/04* (2013.01); *F21S 8/086* (2013.01); *F21V 15/01* (2013.01); *F21V 19/001* (2013.01);
(Continued)

(58) Field of Classification Search
CPC ..... F21V 31/005; F21V 15/01; F21V 15/015; F21V 19/045; F21Y 2105/001; F21Y 2105/30
See application file for complete search history.

(56) References Cited

U.S. PATENT DOCUMENTS 2,332,138 A 10/1943 Epstein
7,434,959 B1 10/2008 Wang
(Continued)

FOREIGN PATENT DOCUMENTS

CN 2842187 Y 11/2006
CN 1967885 A 5/2007
(Continued)

OTHER PUBLICATIONS

Notice of Allowance issued in corresponding U.S. Appl. No. 13/045,812 mailed Apr. 21, 2014.
(Continued)

*Primary Examiner* — Andew Coughlin
(74) *Attorney, Agent, or Firm* — Banner & Witcoff, Ltd.

(57) ABSTRACT

A lighting apparatus according to an embodiment includes an optical unit and a body. The Optical unit includes a light emitting module that has a light emitting element, a reflector that controls distribution of light from the light emitting module, and a unit supporting member that supports the light emitting module and the reflector. A plurality of optical units are mounted to the apparatus body such that each optical unit is detachable. And the body includes an irradiating portion that has an opening through which the optical units irradiate light.

3 Claims, 24 Drawing Sheets

(51) Int. Cl.

| | |
|---|---|
| ***F21S 8/08*** | (2006.01) |
| ***F21V 15/01*** | (2006.01) |
| ***F21V 19/00*** | (2006.01) |
| ***F21V 29/00*** | (2015.01) |
| ***F21V 29/75*** | (2015.01) |
| ***F21V 29/76*** | (2015.01) |
| *F21W 131/103* | (2006.01) |
| *F21Y 101/02* | (2006.01) |
| *F21K 99/00* | (2016.01) |

(52) U.S. Cl.

CPC ............... *F21V 29/006* (2013.01); *F21V 29/75* (2015.01); *F21V 29/76* (2015.01); *F21K 9/30* (2013.01); *F21W 2131/103* (2013.01); *F21Y 2101/02* (2013.01)

(56) References Cited

U.S. PATENT DOCUMENTS

| | | | | |
|---|---|---|---|---|
| 7,506,997 | B1 | 3/2009 | Eriksson | |
| 8,128,260 | B2 | 3/2012 | Ariyoshi | |
| 8,277,067 | B2 | 10/2012 | Park et al. | |
| 8,324,837 | B2 | 12/2012 | Lin | |
| 8,414,546 | B2 | 4/2013 | Ghannoum et al. | |
| 8,814,396 | B2 | 8/2014 | Ishida et al. | |
| 2003/0117798 | A1 | 6/2003 | Leysath | |
| 2003/0156416 | A1 | 8/2003 | Stopa et al. | |
| 2005/0030752 | A1 | 2/2005 | Imai | |
| 2005/0225222 | A1 | 10/2005 | Mazzochette et al. | |
| 2007/0047229 | A1 | 3/2007 | Lee | |
| 2007/0070628 | A1 | 3/2007 | Chen | |
| 2007/0121343 | A1 | 5/2007 | Brown | |
| 2007/0247856 | A1 | 10/2007 | Wang et al. | |
| 2008/0002399 | A1 | 1/2008 | Villard et al. | |
| 2008/0062689 | A1 | 3/2008 | Villard | |
| 2008/0080188 | A1 | 4/2008 | Wang | |
| 2008/0080189 | A1 | 4/2008 | Wang | |
| 2008/0101063 | A1 | 5/2008 | Koike et al. | |
| 2008/0106892 | A1* | 5/2008 | Griffiths et al. | 362/223 |
| 2008/0123367 | A1 | 5/2008 | Pan et al. | |
| 2008/0186695 | A1 | 8/2008 | Awai et al. | |
| 2008/0310162 | A1 | 12/2008 | Thomas et al. | |
| 2009/0086491 | A1 | 4/2009 | Ruud et al. | |
| 2009/0127721 | A1 | 5/2009 | Isono | |
| 2009/0296405 | A1 | 12/2009 | Tetsuo | |
| 2009/0303715 | A1 | 12/2009 | Takasago et al. | |
| 2010/0002430 | A1 | 1/2010 | Liou et al. | |
| 2010/0053953 | A1 | 3/2010 | Wung et al. | |
| 2010/0073932 | A1 | 3/2010 | Zheng | |
| 2010/0118548 | A1 | 5/2010 | Nezu | |
| 2010/0142201 | A1 | 6/2010 | Venturini | |
| 2010/0214780 | A1 | 8/2010 | Villard | |
| 2010/0296289 | A1 | 11/2010 | Villard et al. | |
| 2010/0328945 | A1* | 12/2010 | Song et al. | 362/240 |
| 2011/0110083 | A1 | 5/2011 | Pahlke et al. | |
| 2011/0121704 | A1* | 5/2011 | Wang et al. | 313/46 |
| 2011/0235335 | A1 | 9/2011 | Ishida et al. | |
| 2011/0310590 | A1 | 12/2011 | Yamashita et al. | |
| 2014/0328068 | A1 | 11/2014 | Ishida et al. | |

FOREIGN PATENT DOCUMENTS

| | | | |
|---|---|---|---|
| CN | 101101096 | A | 1/2008 |
| CN | 101101102 | A | 1/2008 |
| CN | 101174612 | A | 5/2008 |
| CN | 201180920 | Y | 1/2009 |
| CN | 201218482 | Y | 4/2009 |
| CN | 201348169 | Y | 11/2009 |
| CN | 101603656 | A | 12/2009 |
| CN | 201407528 | Y | 2/2010 |
| DE | 202007001148 | U1 | 3/2007 |
| DE | 202007011385 | U1 | 12/2007 |
| DE | 202009004191 | U1 | 6/2009 |
| DE | 102008007723 | A1 | 8/2009 |
| DE | 102008022414 | A1 | 11/2009 |
| EP | 1760393 | A1 | 3/2007 |
| EP | 1916468 | A1 | 4/2008 |
| EP | 2058584 | A1 | 5/2009 |
| EP | 2133621 | A2 | 12/2009 |
| EP | 2138758 | A1 | 12/2009 |
| EP | 2372233 | A2 | 10/2011 |
| GB | 487122 | A | 6/1938 |
| JP | 2000-149610 | A | 5/2000 |
| JP | 3086473 | U | 3/2002 |
| JP | 2003-203506 | A | 7/2003 |
| JP | 2004-200102 | A | 7/2004 |
| JP | 3694310 | B1 | 9/2005 |
| JP | 2006-299618 | A | 11/2006 |
| JP | 2007-095524 | A | 4/2007 |
| JP | 2007-165051 | A | 6/2007 |
| JP | 2007-242258 | A | 9/2007 |
| JP | 3137249 | U | 10/2007 |
| JP | 2008-210655 | A | 9/2008 |
| JP | 3146045 | U | 10/2008 |
| JP | 2009-044055 | A | 2/2009 |
| JP | 2009-048894 | A | 3/2009 |
| JP | 2009-088190 | A | 4/2009 |
| JP | 2009-099526 | A | 5/2009 |
| JP | 2009-164567 | A | 7/2009 |
| JP | 2009-245846 | A | 10/2009 |
| JP | 2009-290181 | A | 12/2009 |
| JP | 2009-290244 | A | 12/2009 |
| JP | 2010-030806 | A | 2/2010 |
| JP | 2010-067415 | A | 3/2010 |
| WO | 2007-088665 | A1 | 8/2007 |
| WO | 2009-119929 | A1 | 10/2009 |

OTHER PUBLICATIONS

U.S. Appl. No. 13/169,814.
U.S. Appl. No. 13/045,831.
U.S. Appl. No. 12/473,482.
U.S. Appl. No. 12/615,753.
Extended European Search Report issued in EP 11157901.7 dated Jun. 20, 2012.
Office Action issued in corresponding application CN 200910146546.8 on Jun. 23, 2010.
Chinese Office Action issued in application No. 201110057672 on Nov. 14, 2012.
Chinese Office Action issued in application No. 201110057675 on Nov. 5, 2012.
Chinese Office Action issued in application No. 201110176633.4 on Feb. 4, 2013.
Nov. 20, 2011—(JP) Office Action—App 2011-032546.
Nov. 20, 2011—(JP) Office Action—App 2011-032546—Eng Tran.
Nov. 10, 2015—Translation of (JP) Summary of Notification of Reasons for Refusal—App JP2015-010477.
Oct. 27, 2015—Translation of (JP) Summary of Notification of Reasons for Refusal—App JP2015-010476.
Nov. 10, 2015—(JP) Summary of Notification of Reasons for Refusal—App JP2015-010477.
Oct. 27, 2015—(JP) Summary of Notification of Reasons for Refusal—App JP2015-010476.
Jan. 28, 2016—(EP) Extended European Search Report—App 15181203.9.

* cited by examiner

LIGHTING APPARATUS

CROSS-REFERENCE TO RELATED APPLICATIONS

This application is a continuation of U.S. patent application Ser. No. 13/045,812 filed Mar. 11, 2011, which claims the benefit of priority of Japanese Patent Application No. 2010-075519, filed Mar. 29, 2010; Japanese Patent Application No. 2010-234909, filed Oct. 19, 2010; and Japanese Patent Application No. 2011-032546, filed Feb. 17, 2011; the entire contents of all of which are incorporated herein by reference.

FIELD

Embodiments described herein relate generally to a lighting apparatus.

BACKGROUND

A lighting apparatus lighting apparatus is sometimes constructed so that the light irradiation directions of respective LED modules can be adjusted. One way of adjusting the light irradiation directions is to adjust a mounting angle of the relevant LED module that is arranged on the apparatus main body. When using this way, the lighting apparatus does not include a reflecting mirror.

However, when lighting apparatus does not include a reflecting mirror, the distribution of light of the LED modules is hard to control. Hence, there occurs the problem that a large quantity of light leaks to outside of the region to be illuminated, and therefore the illumination efficiency is not high. In particular, since light irradiated in the width direction of a road that is the illumination object cannot be controlled by a reflecting mirror, a large quantity of light leaks to the width direction of the road and there is a significant risk of the leaking light adversely affecting neighboring residences.

Further, since a plurality of LED modules are fixed to the mount of the lighting apparatus, for example, if a malfunction such as a non-lighting occurs in one part of an LED module, it is not possible to replace only the LED module in which the malfunction has occurred, and the entire lighting apparatus must be replaced. Hence, there is also the problem that the maintenance costs are high.

BRIEF DESCRIPTION OF THE DRAWINGS

FIG. 2 is viewed from overhead;

DETAILED DESCRIPTION

A lighting apparatus according to an embodiment will be described with reference to the accompanying drawings. The lighting apparatus according to an embodiment includes an optical unit and a body. The Optical unit includes a light emitting module that has a light emitting element, a reflector that controls distribution of light from the light emitting module, and a unit supporting member that supports the light emitting module and the reflector. A plurality of optical units are mounted to the apparatus body such that each optical unit is detachable. And the body includes an irradiating portion that has an opening through which the optical units irradiate light.

Figure 2:
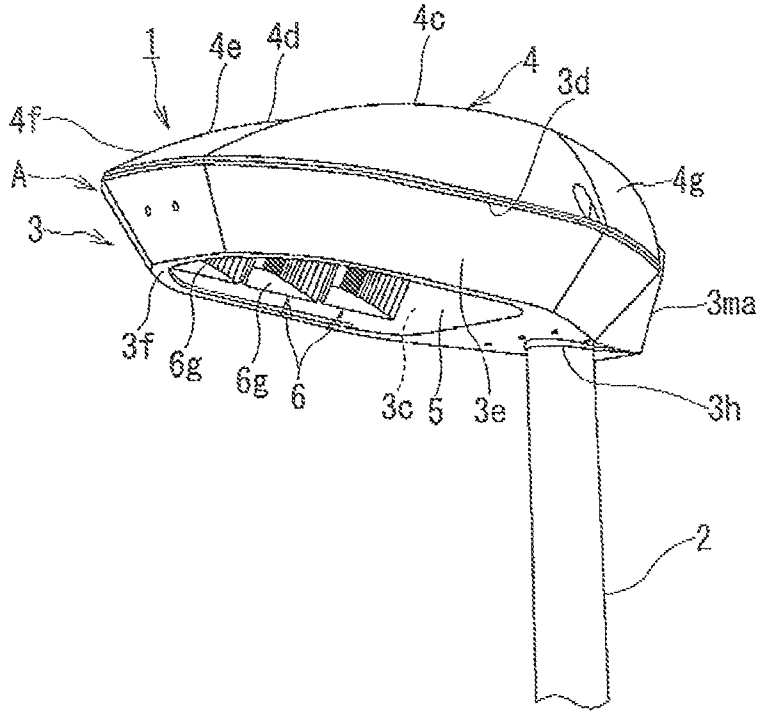
FIG. 2 is an external perspective view when a state in which the lighting apparatus shown in FIG. 1 is arranged on a support column is viewed from underneath.
Figure 3:
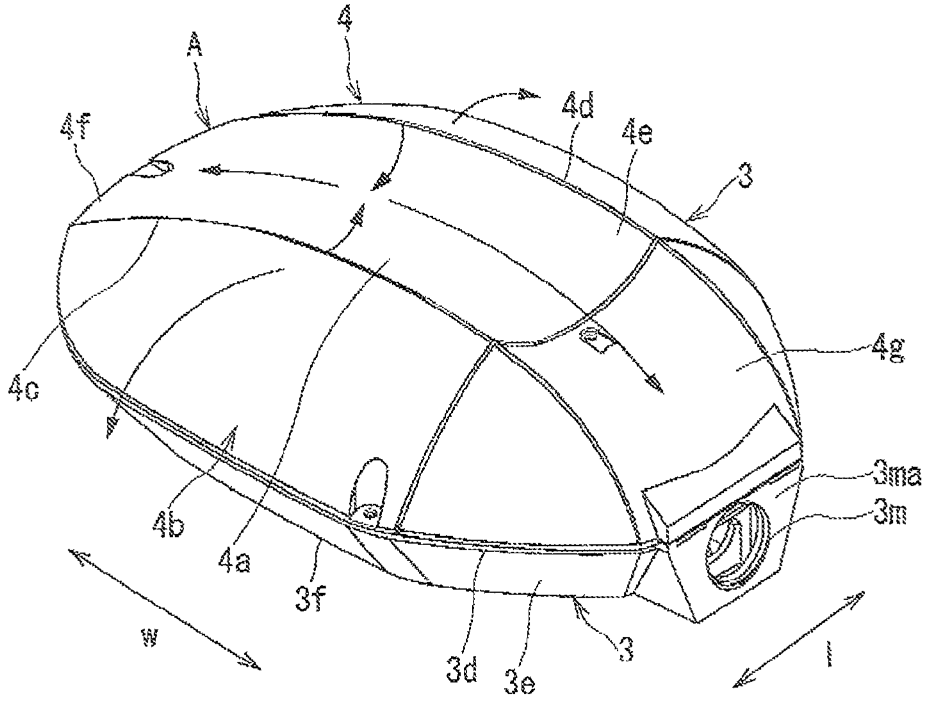
FIG. 3 is an external perspective view when the lighting apparatus shown in FIG. 1
Figure 4:
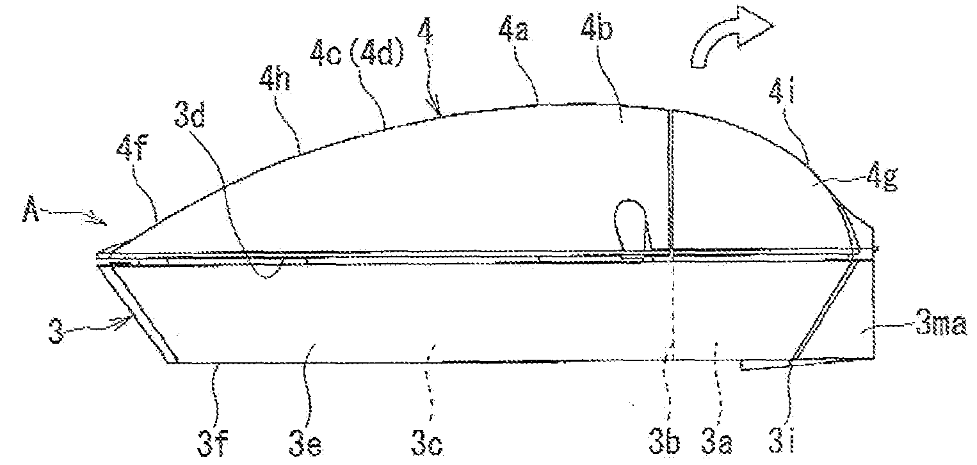
FIG. 4 is a front view of the lighting apparatus shown in FIGS. 1 to 3.
Figure 5:
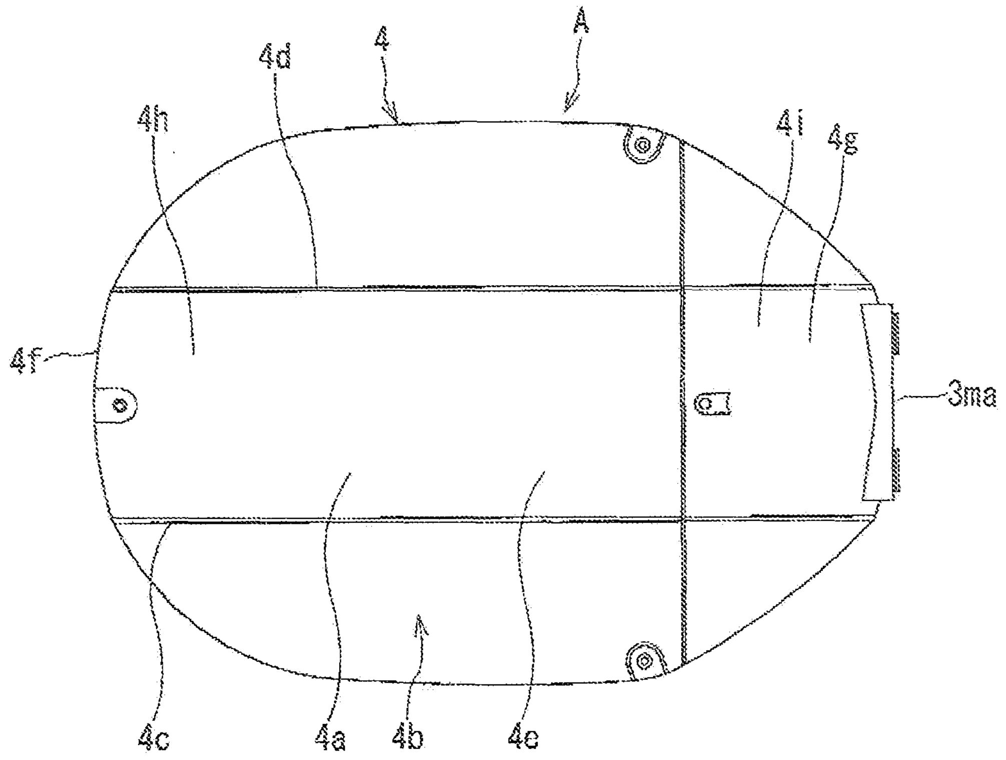
FIG. 5 is a plan view of the lighting apparatus shown in FIGS. 1 to 3.
Figure 6:
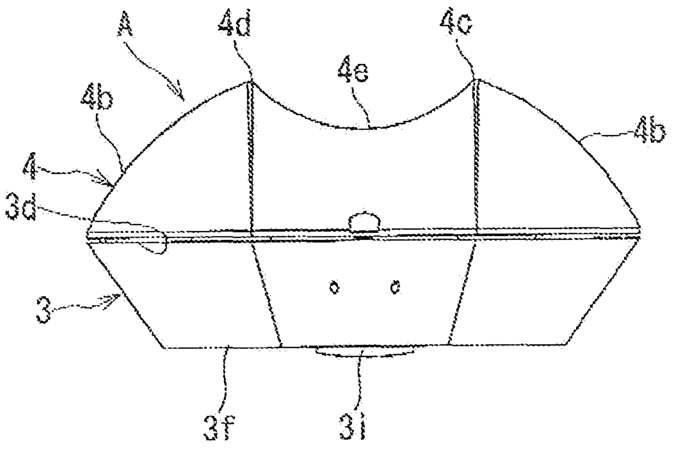
FIG. 6 is a left side view of the lighting apparatus shown in FIGS. 1 to 3.

FIG. 2 is an external perspective view when a state in which an lighting apparatus according to one embodiment of the present invention is arranged on a pole (support column) is viewed from underneath. FIG. 3 is an external perspective view when the lighting apparatus according to one embodiment of the present invention is viewed from overhead. FIG. 4 is a front view of the lighting apparatus according to one embodiment of the present invention. FIG. 5 is a plan view of the lighting apparatus according to one embodiment of the present invention.

As shown in the aforementioned drawings, an lighting apparatus 1 according to the embodiment can be used, for example, as a road light or the like on a road such as a highway or an ordinary road. Hence, a case is described hereunder in which the lighting apparatus is applied to a road light. As shown in FIG. 2, the lighting apparatus 1 is arranged at, for example, a height of approximately 10 meters above ground by a pole 2 comprising a hollow circular column or a hollow angular column or the like as a support column. The pole 2, for example, is firmly erected above the ground at the outer side of an edge in the width direction of a road such as a highway, and a plurality of the poles 2 are erected at a required pitch in the longitudinal direction of the road. As shown in FIG. 3 to FIG. 5, the lighting apparatus 1 has an apparatus main body A. The apparatus main body A is constituted by hermetically closing an upper end 3*d* of an opening of a case main body 3 by fixing a top cover 4 that is one example of a cover to an open end of the upper surface in the drawing of the case main body 3 by screwing the top cover 4 to the open end or the like.

As shown in FIG. 3, a planar shape of the top cover 4 is formed in an approximately oblong shape by, for example, a die-cast aluminum material. The top cover 4 is formed so that a length W thereof along a width direction (the left-to-right direction in FIG. 4 and FIG. 5) of a road (not shown in the drawings) that is one example of an illumination object is longer than a length 1 along a longitudinal direction (vertical direction in FIG. 4 and FIG. 5) of the road.

As shown in FIG. 3 to FIG. 7, the upper surface of the top cover 4 in the drawings has a curved surface 4*b* which protrudes outward in a manner in which an approximately center section thereof is an apex 4*a*. In the curved surface 4*b*, a pair of projecting portions 4*c* and 4*d* at the front and rear of an outward convexity are integrally coupled in the longitudinal direction of the top cover 4.

The projecting portions 4*c* and 4*d* are arranged in an approximately parallel condition with a required space therebetween in the width direction of the top cover 4. A band-shaped concave portion 4*e* that is recessed in the shape of a concave arc on the inner side is integrally coupled between the projecting portions 4*c* and 4*d*.

The concave arc-shaped concave portion 4*e* is integrally coupled to a front end portion (left end portion in FIG. 4 and FIG. 5) 4*f* and a rear end portion (right end portion in FIG. 4 and FIG. 5) 4*g* by downward inclined planes 4*h* and 4*i* which are formed as curved surfaces that gradually descend from the center section 4*a* of the top cover 4 towards the front end portion 4*f* and the rear end portion 4*g*, respectively. More specifically, the outer surface of the top cover 4 is formed in a streamline shape that reduces air resistance when external air flows in the longitudinal direction and the width direction as shown by the arrows in FIG. 3.

As shown in FIG. 4, the rear end of the rear end portion 4*g* of the top cover 4 is rotatably attached to an upper end portion of the rear end (right end in FIG. 4) of the case main body 3. Thus, the top cover 4 is formed as an opening/closing cover that can open and close in the direction of the white arrow in FIG. 4.

An electricity chamber 3*a* is formed inside the rear end portion (right end portion in FIG. 4) of the case main body 3 below the opening/closing cover 4*g* in FIG. 4. The electricity chamber 3*a* is partitioned from a light source chamber 3*c*, described later, by a partitioning wall 3*b* indicated by a dashed line in FIG. 4. A power source terminal (omitted from the drawings), a power source line that is connected to the power source terminal, and one end of a lighting control line are housed in the electricity chamber 3*a* in a watertight manner.

Figure 7:
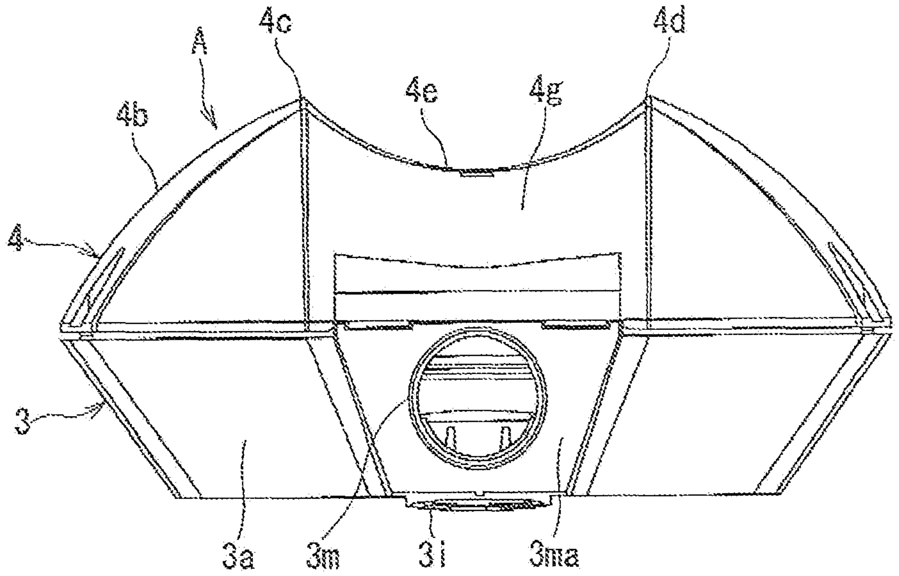
FIG. 7 is a right side view of the lighting apparatus shown in FIGS. 1 to 3.
Figure 14:
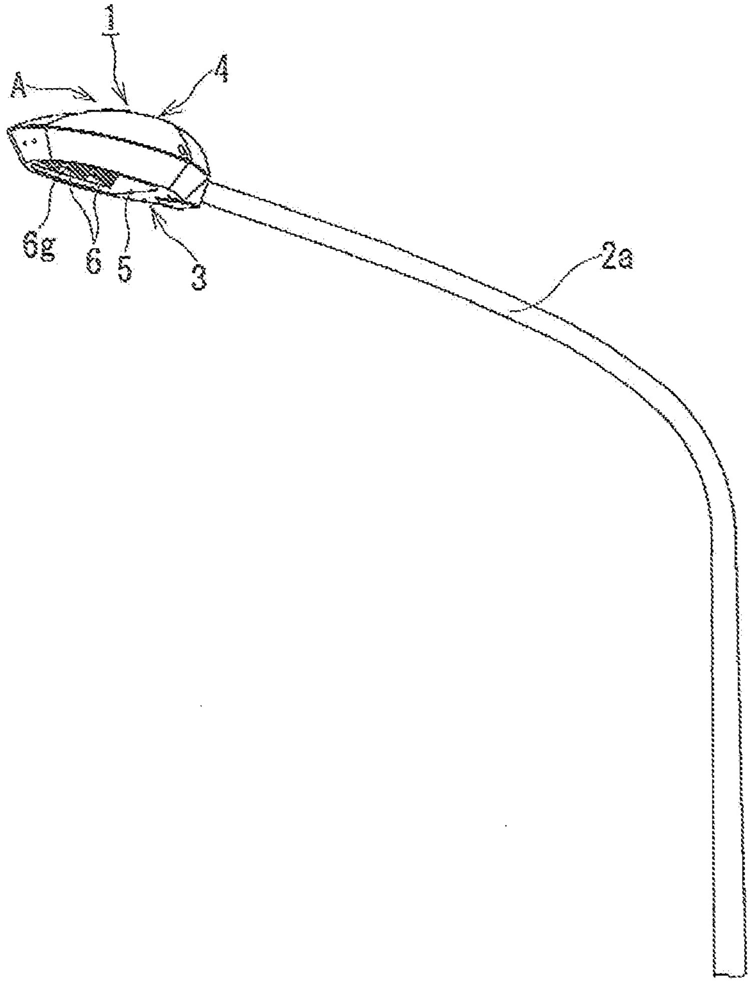
FIG. 14 is an elevated perspective view of an lighting apparatus arranged on a curved pole.

As shown in FIG. 7, a pole coupling portion 3*ma* that has a lateral hole for pole insertion 3*m* into which a distal end portion of a curved pole 2*a* shown in FIG. 14 is inserted and fixed is formed in the rear end wall of the case main body 3 that is the rear end wall of the electricity chamber 3*a*.

As shown in FIG. 2 the case main body 3 that has a polygonal cylindrical shape in which an opening is formed in the upper and lower ends in the drawing is detachably coupled by screwing to a lower end of an opening in the drawing of the top cover 4. In the case main body 3, a planar shape of an upper end portion 3*d* that is coupled with the top cover 4 is formed in a polygonal, flat cylindrical shape that is formed in an approximately oblong form that is the same form and same size as the oblong form of the planar shape of the top cover 4. Further, a side surface 3*e* is formed in an inclined plane that gradually decreases towards the lower end 3*f* in the drawing. A large opening portion (omitted from the drawings) that passes through almost the entire surface of the upper end in the drawings of the light source chamber 3*c* is formed in the upper end portion 3*d* of the case main body 3.

Figure 1:
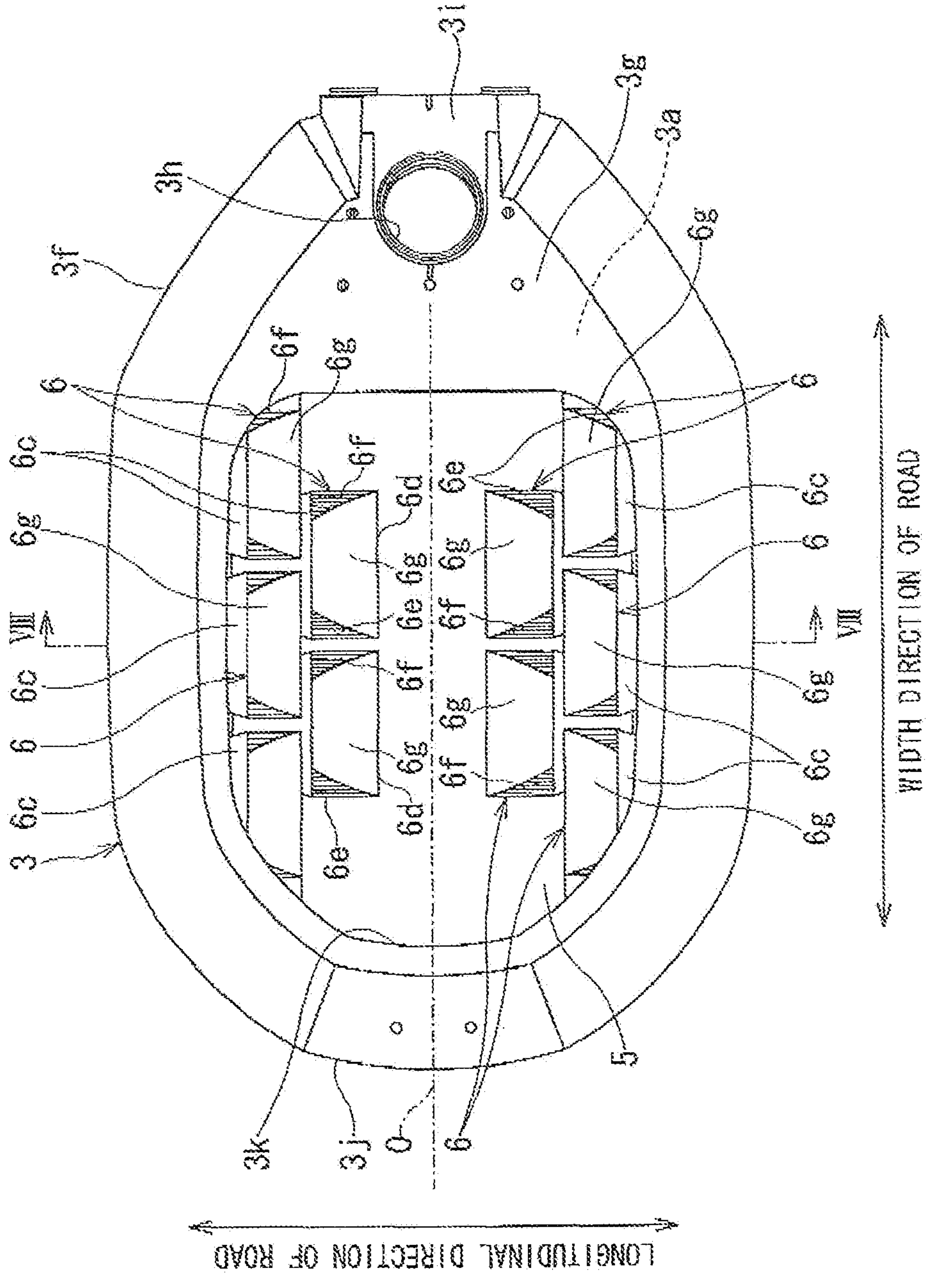
FIG. 1 is a bottom view of an lighting apparatus according to the first embodiment of the present invention.

FIG. 1 is a bottom view of the lower end 3*f* of the case main body 3. As shown in FIG. 1, in the case main body 3, a pole coupling portion 3*i* that has a vertical hole for pole insertion 3*h* into which, for example, a distal end portion of the pole 2 that has a straight bar shape that is shown in FIG. 2 is inserted and fixed is formed in the lower end portion 3*f* of a rear end portion (right end in FIG. 1) 3*g* on the electricity chamber 3*a* side thereof. A polygonal opening 3*k* having a shape of a horizontally-long rectangle in which each corner portion has been chamfered is formed on a front end portion (left end in FIG. 1) 3*j* side of the case main body 3. A translucent plate 5 comprising tempered glass that is one example of a translucent body is arranged in the opening 3*k* to seal the light source chamber 3*c* in a watertight and airtight manner. A plurality of LED optical units 6, 6, are aligned in a plurality of rows, for example, in FIG. 1, four horizontal rows, and housed inside the light source chamber 3*c*.

A required number, for example, five, of the LED optical units 6, 6, . . . are symmetrically arranged on the left and right sides (top and bottom in FIG. 1), respectively, taking a central axis O that passes through the center of the four rows in the front-to-rear direction (the left-to-right direction in FIG. 1) of the case main body 3 as an axis of symmetry.

The LED optical units 6, 6, . . . on each side are, for example, arranged so that a required number, for example, two, of the LED optical units 6, 6, . . . are arranged in parallel in the axial direction of the central axis O on an inner side "in" (central axis O side) of the array, and a required number, for example, three, of the LED optical units 6, 6, . . . are arranged in parallel in the axial direction of the central axis O on an outer side "out" thereof. With respect to the LED optical units 6, 6, . . . that are arranged on the left and right sides, by disposing the irradiation openings 6*g* thereof so as to cross with respect to each other towards the opposite sides in the left-to-right direction, the respective irradiation lights from the LED optical units 6, 6, . . . intersect below the LED optical units 6, 6, . . . .

Figure 8:
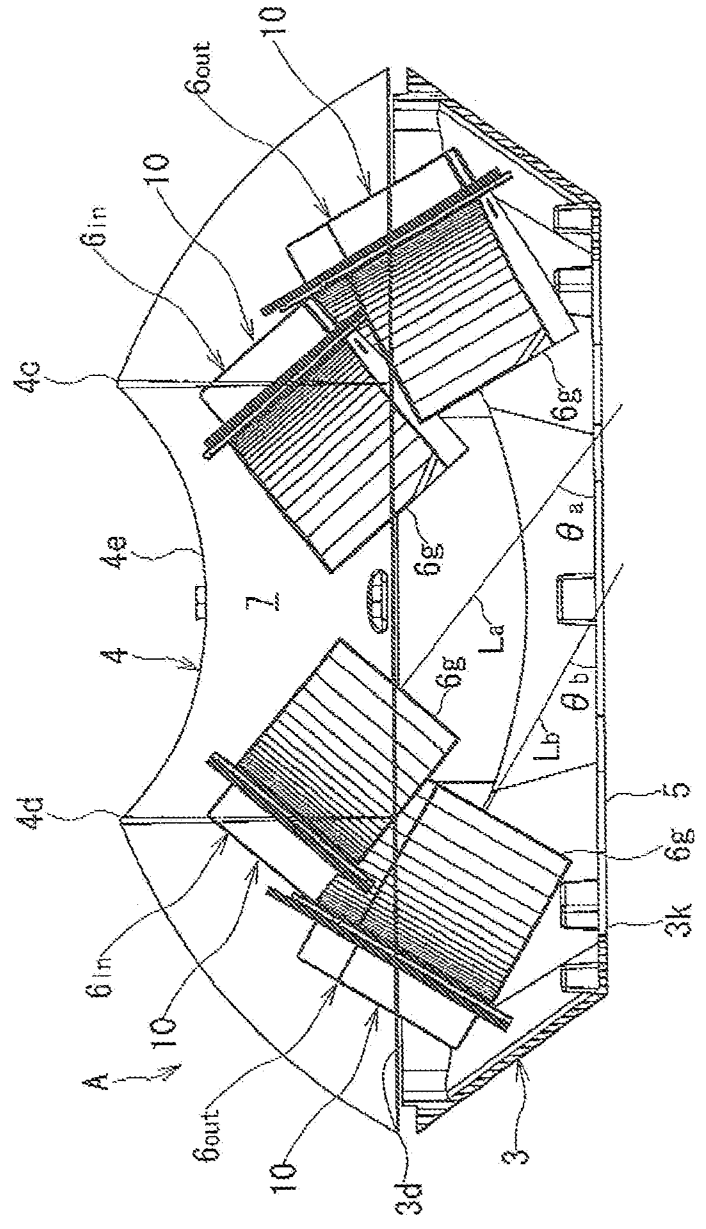
FIG. 8 is a schematic sectional view along a line VIII-VIII in FIG. 1.

As shown in FIG. 8, when the top cover 4 and the case main body 3 are joined together, the inner space thereof is formed into a light source housing portion 7 that houses a plurality of the LED optical units 6, 6, . . . . Inside the light source housing portion 7, each LED optical unit 6in as a first one of the plurality of the optical units 6 of the array on the inner side is disposed above, that is, at a higher position than (upper level), each LED optical unit 6out as a second one of the plurality of the optical units 6 of the array on the outer side. The inner side and outer side LED optical units 6in and 6out that are arranged on the left and right in FIG. 8 are aligned in a truncated chevron shape that expands like a folding fan in the downward direction in the drawings, and are aligned in an intersecting truncated chevron shape. In order to irradiate light in the proximity of the lighting apparatus 1, each LED optical unit 6in on the inner side is fixed in an inclined state so that a light axis La of the irradiation light thereof is at a required angle θa (for example, 50°) with respect to the surface of the translucent plate 5. Further, in order to irradiate light to an area farther away than the proximity of the lighting apparatus 1, each LED optical unit bout on the outer side is fixed in an inclined state so that a light axis Lb of the irradiation light thereof is at a required angle θb (for example, 60°) with respect to the surface of the translucent plate 5.

Figure 9:
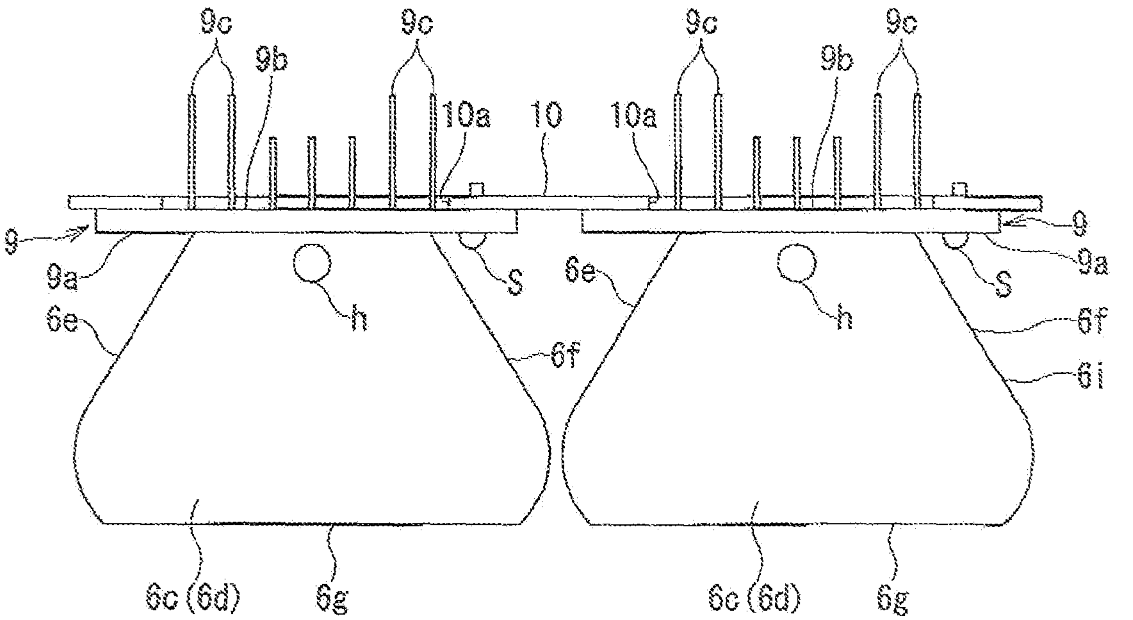
FIG. 9 is a plan view when two of the LED optical units shown in FIG. 1 and FIG. 2 are arranged side by side on a unit support plate.
Figure 10:
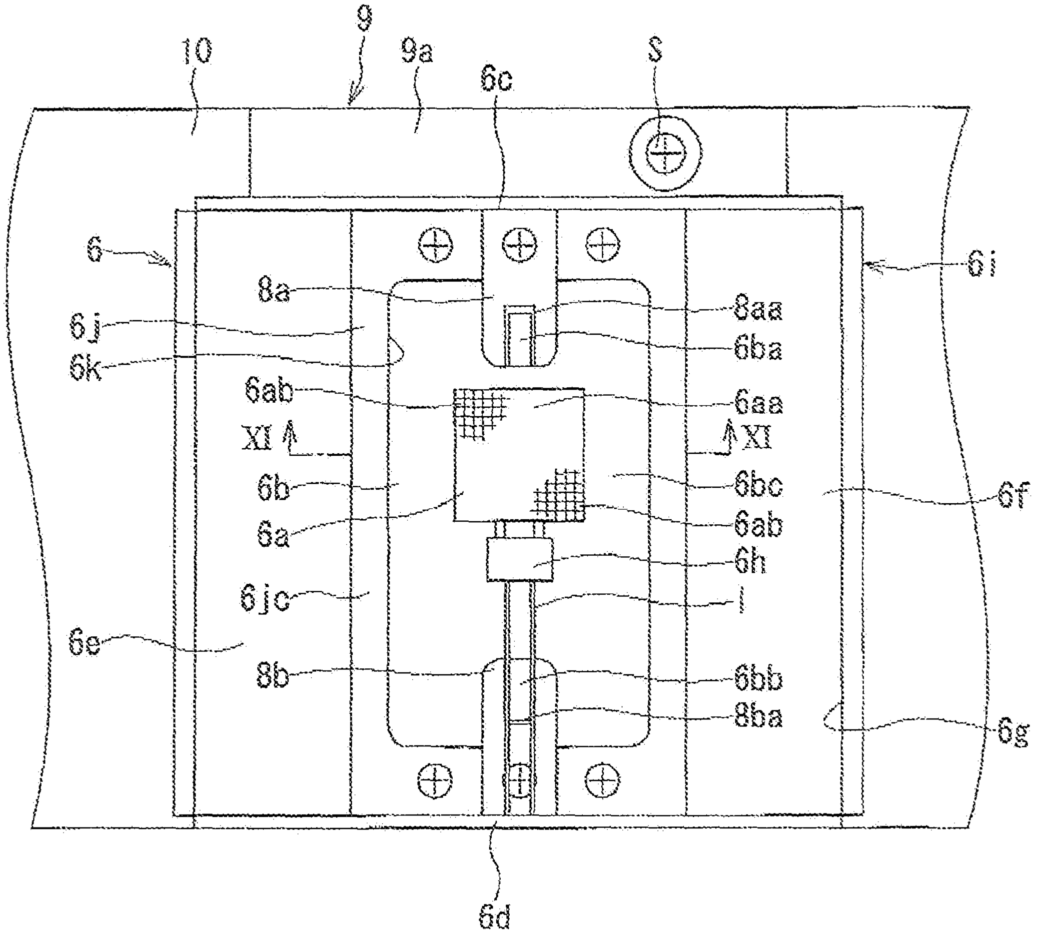
FIG. 10 is a front view when an LED optical unit shown in FIG. 8 is viewed from the front of an irradiation opening thereof.

As shown in FIG. 1 and FIGS. 8 to 13, each LED optical unit 6 has an LED (light emitting diode) module 6*a*, a ceramic substrate 6*b* that is an example of a support substrate thereof, an upper and lower pair of flat mirrors 6*c* and 6*d* in FIG. 10 as a first reflective surface, a left and right pair of side curved mirrors 6*e* and 6*f* in FIG. 10 as a second reflective surface, and a reflecting tube 6*i* that is constructed as a trumpet-shaped angular cylindrical body in which the four mirrors 6*c* to 6*f* are unified or joined in an integrated manner. The reflecting tube 6*i* has a rectangular irradiation opening 6*g* that expands in a trumpet shape, and a bottom portion 6*j* whose diameter contracts in a trumpet shape on the opposite side in the axial direction thereof.

As shown in FIG. 10, the LED module 6*a*, for example, includes a COB (chip on board) type pseudo-white (blue-yellow system) LED bare chip 6*ab* as a light emitting element. More specifically, the LED module 6*a* includes a required number (for example, 196) of LED bare chips 6*ab* that emit blue light. The LED bare chips 6*ab* are directly mounted on a printed circuit board on which a circuit is formed, and arranged in a plurality of rows (14 rows, for example) and a plurality of columns (14 columns, for example). Subsequently, a resin containing phosphors that emit yellow light is applied onto the LED bare chips 6*ab*, the resulting structure is sealed by a silicone resin. The LED module 6*a* constructed in this manner is adhered by, for example, a silicone resin or the like on an approximately center section of a front face 6*bc* of the ceramic substrate 6*b*.

Figure 11A:
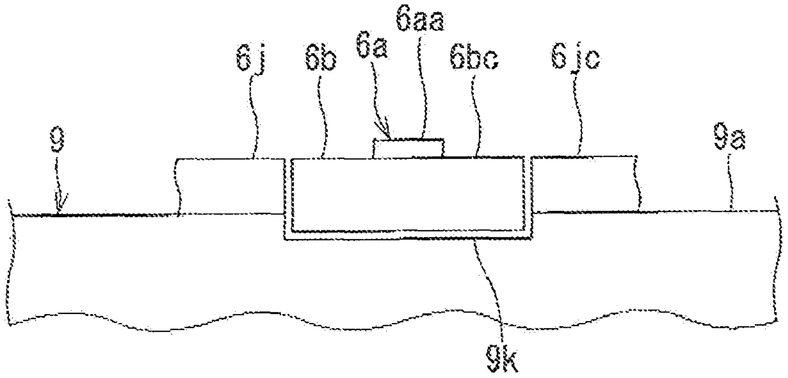
FIG. 11A is a schematic end view of a cross section along a line XI-XI shown in FIG. 10.
Figure 11B:
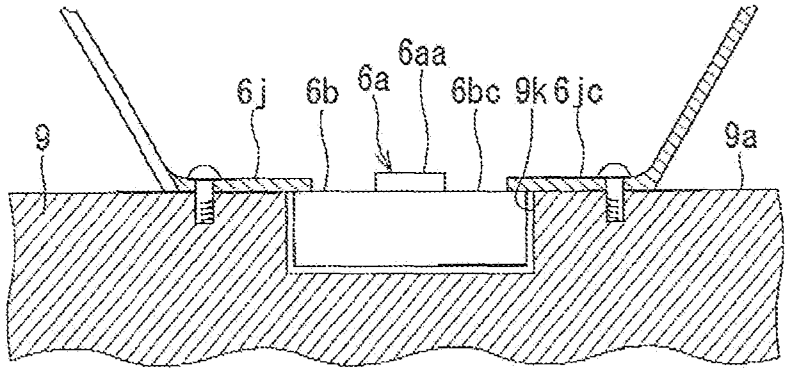
FIG. 11B is a schematic sectional view that shows a modification example of FIG. 11A.

More specifically, as shown in FIG. 11A, a back side end portion of the ceramic substrate 6*b* is fitted inside a fitting opening portion 9*k* of a unit support plate 9 as a unit supporting member. The LED module 6*a* is adhered to the ceramic substrate 6*b* so that, in this fitted state, a light emitting surface 6*aa* of the LED module 6*a* is caused to protrude somewhat more upward in the drawing of FIG. 11A, that is, more forward, than an inner bottom face 6*jc* of a bottom portion 6*j* on the contracted diameter side of the reflecting tube 6*i* so as to be exposed to outside. Consequently, the light emitting surface 6*aa* of the LED module 6*a* is arranged so as to be at a position that protrudes somewhat more forward than the inner bottom face 6*jc* of the bottom portion 6*j* on the contracted diameter side of the reflecting tube 6*i* in this adhered state. FIG. 11B is a longitudinal sectional view that illustrates a modification example of positioning of the ceramic substrate 6*b* shown in FIG. 11A. According to this modification example, by making a depth of the fitting opening portion 9*k* of the unit support plate 9 with which the ceramic substrate 6*b* is engaged deeper than the fitting opening portion 9*k* shown in FIG. 11A, the front face 6*bc* of the upper surface in the figure of the ceramic substrate 6*b* may be configured to be approximately matched and be flush with a front face 9*a* of the unit support plate 9.

Figure 12:
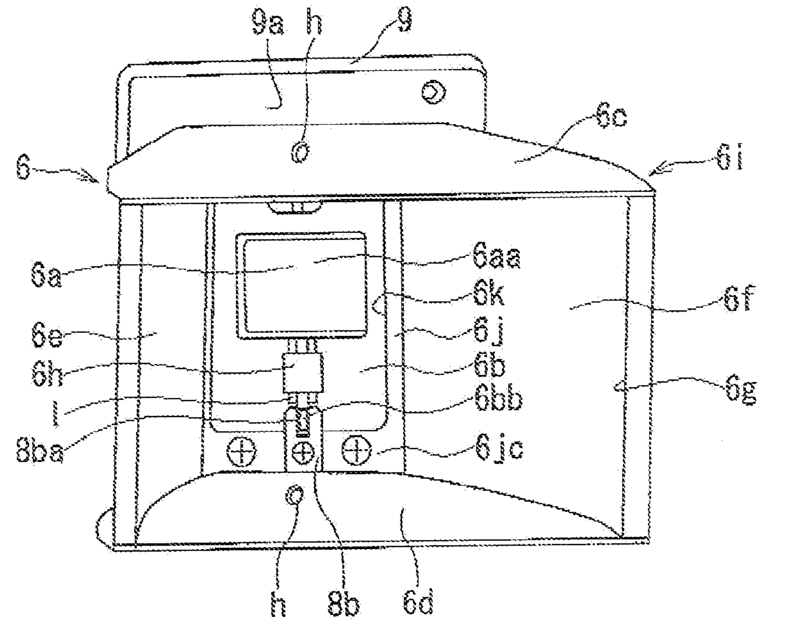
FIG. 12 is a perspective view of an LED optical unit shown in FIG. 1 and the like when viewed from the front.

With respect to the trumpet-shaped reflecting tube 6*i* shown in FIG. 12, the left and right pair of side curved mirrors 6*e* and 6*f* in the drawing are formed, for example, by curvedly forming a flat plate of aluminum or the like at a required angle and then forming the inner surface thereof as a reflective surface such as a mirror surface. Further, the curved reflective surface is formed so as to gradually expand towards both sides in the width direction of the road that is the illumination object. Thus, the reflecting tube 6*i* mainly controls the light distribution of light irradiated from the LED module 6*a* in the width direction of the road. More specifically, each of the LED optical units 6, 6, . . . mainly controls the light distribution characteristics in the road width direction along the axial direction of the central axis O as shown in FIG. 1. In this connection, portions represented by a plurality of parallel vertical lines of each of the side curved mirrors 6*e* and 6*f* in FIG. 1 indicate the respective curved inner surfaces (that is, the reflective surfaces) of each of the side curved mirrors 6*e* and 6*f*.

Figure 13:
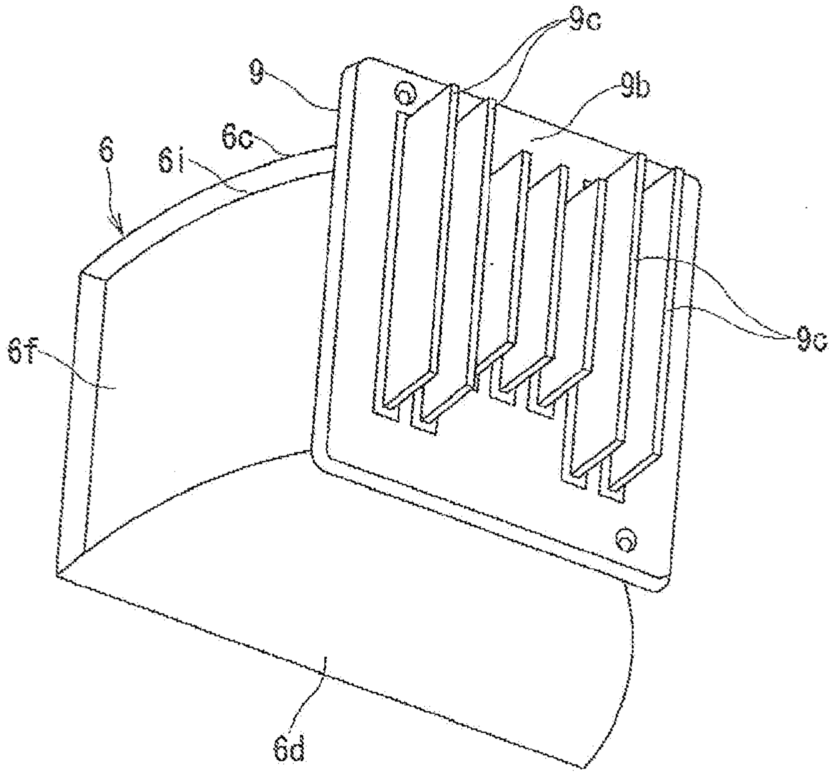
FIG. 13 is a perspective view of the LED optical unit shown in FIG. 1 and the like when viewed from the rear.

The upper and lower pair of flat mirrors 6*c* and 6*d* made of aluminum are joined in an integrated manner to the left and right pair of side curved mirrors 6*e* and 6*f* as shown in FIG. 12 and FIG. 13 to thereby form the reflecting tube 6*i* as a bottomed, trumpet-shaped angular cylindrical body that gradually expands towards an illumination opening 6*g*. As shown in FIG. 10 and FIG. 12, the trumpet-shaped reflecting tube 6*i* forms a fitting opening portion 6*k* that interfits with the aforementioned ceramic substrate 6*b* on a center section of a bottom portion 6*j* on the contracted diameter side of the reflecting tube 6*i*. The ceramic substrate 6*b* is accommodated inside the fitting opening portion 6*k*. When the ceramic substrate 6*b* is accommodated therein, as shown in FIGS. 11A and 11B, a front face 6*bc* of the ceramic substrate 6*b* is approximately flush with an inner surface 6*jc* of the bottom portion 6*j* of the reflecting tube 6*i*. A reflective surface such as a mirror surface is formed on the inner surface of the upper and lower pair of flat mirrors 6*c* and 6*d*, and the pair of flat mirrors 6*c* and 6*d* are arranged side by side in an approximately parallel manner with a required clearance therebetween in the vertical direction in the drawings. Hence, the upper and lower pair of flat mirrors 6*c* and 6*d* do not control light irradiated to outside from the irradiation opening 6*g* so as to magnify the irradiated light. Further, as shown in FIG. 9, heat dissipation holes h and h are formed in the vicinity of the LED module 6*a* in the upper and lower pair of flat mirrors 6*c* and 6*d*, respectively.

The flat and side mirrors 6*c* to 6*f* are configured so that primary reflected light converges at a height of approximately meters above ground when the apparatus main body A is arranged at a height of approximately 10 meters above ground by means of the pole 2.

The back surface of the ceramic substrate 6*b* is fitted inside the fitting opening portion 9*k* formed on the front face 9*a* of the unit support plate 9 that is formed in the shape of a rectangular flat plate that is made of a metal such as aluminum that is shown in FIG. 9, FIGS. 11A and 11B, FIG. 12, and FIG. 13. In this fitted state, the front face of the ceramic substrate 6*b* is elastically supported by free ends of an upper and lower pair of plate springs 8*a* and 8*b* that are an example of a presser. An end on a side opposite to the free end of the plate springs 8*a* and 8*b* is fixed by screwing to the unit support plate 9. More specifically, the ceramic substrate 6*b* is elastically sandwiched in the thickness direction by the upper and lower pair of plate springs 8*a* and 8*b* and the unit support plate 9.

The upper end and lower end of the plate springs 8*a* and 8*b* screwed into the upper and lower ends of the bottom portion 6*j* of the reflecting tube 6*i*, respectively, to thereby fix the plate springs 8*a* and 8*b* thereto. Each inner end portion of the plate springs 8*a* and 8*b* protrudes over the front face of the ceramic substrate 6*b*. Slits 8*aa* and 8*ba* that open at an inner end and extend in the vertical direction in FIG. 10 are formed in the protruding end portions, respectively. Small engagement protrusions 6*ba* and 6*bb* formed in a vertically long rectangular shape are provided in a protruding condition at the upper end and lower end of the front face of the ceramic substrate 6*b*, respectively. By inserting the small engagement protrusions 6*ba* and 6*bb* into the slits 8*aa* and 8*ba*, the ceramic substrate 6*b* is supported with a certain degree of play. In FIG. 10, reference symbol 6*h* denotes a power supply connector that is electrically and detachably connected to the LED module 6*a*. The connector 6*h* is electrically connected to a power source terminal inside the electricity chamber 3*a* by a lead wire 1.

As shown in FIG. 9 and FIG. 13, a plurality of heat dissipation fins 9*c*, 9*c*, . . . made of a metal such as aluminum are formed on a back face 9*b* of the unit support plate 9 in the LED optical unit 6. The outward protruding length of the heat dissipation fins 9*c*, 9*c*, . . . may be the same as each other or, as shown in FIG. 9 and FIG. 13, the outward protruding length of several of the heat dissipation fins 9*c*, 9*c*, . . . on the inner side in the parallel arrangement direction may be shorter than the outward protruding length of the heat dissipation fins 9*c*, 9*c*, . . . on the outer side.

As shown in FIG. 9, a plurality of the LED optical units 6 that are constructed in this manner are detachably attached by bolts or screws S or the like to a unit mounting plate 10. The unit mounting plate 10 is formed in a band-plate shape.

More specifically, a rectangular insertion hole 10*a* through which the plurality of heat dissipation fins 9*c*, 9*c*, are inserted is formed in the plate thickness direction of the unit mounting plate 10. The support plate 9 of the LED optical unit 6 is detachably fixed by a screw S to the unit mounting plate 10 in a state in which the plurality of heat dissipation fins 9*c*, 9*c*, . . . are inserted through the insertion hole 10*a*. On the unit mounting plates 10, for example, two of the inner side LED optical units 6in are arranged side by side and, for example, three of the outer side LED optical units bout are arranged side by side. The unit mounting plates 10 are fixed at required places on the inner surface of the aforementioned top cover 4. More specifically, all of the LED optical units 6, 6, are detachably fixed to the inner surface of the top cover 4. At the time of fixing, at least one part of the unit support plate 9 of the LED optical units 6, 6, . . . is brought in contact directly with the inner surface of the top cover 4 or is brought in contact with the inner surface of the top cover 4 through a heat dissipating body such as a metal plate with excellent heat dissipation properties or a heat pipe to thereby enhance the heat dissipation properties of the lighting apparatus 1.

A plurality of power source systems, for example, two power source systems, are provided at a part of the LED optical units 6, 6, . . . that are constructed in the above manner. The power source systems are electrically connected to the LED optical units 6, 6, . . . so that, for example, in a case where a malfunction such as non-lighting occurs, it is possible to ensure bilateral symmetry when taking the central axis O of the remaining LED optical units 6, 6, . . . that are irradiating light as the axis of symmetry.

Consequently, even if one of the power source systems is cut off due to some cause, the LED optical units 6, 6, . . . can be turned on to irradiate light by the remaining power source system, or if the LED optical units 6, 6, . . . are already irradiating light, that lighting can be maintained.

The plurality of power source systems may also be connected to the LED optical units 6, 6, . . . so as to maintain the bilateral symmetry of the lighting of the LED optical units 6, 6, . . . around the central axis O as the axis of symmetry.

For example, a configuration may be adopted in which two power source systems are provided, and one of the power source systems is connected to each of the four inner side LED optical units 6in, 6in, . . . , and the other power source system is connected to each of the six inner side LED optical units 6out, 6out, . . . . According to this configuration, even if one of the power source systems is cut off, either one of the inner side and outer side LED optical units 6in, 6out, . . . can be caused to irradiate light and, furthermore, the bilateral symmetry can be maintained when irradiating light.

The power source lines of the plurality of systems are connected to a secondary side of a power source terminal block inside the electricity chamber 3*a* of the case main body 3. An unshown primary-side power source line is electrically connected to the primary side of the power source terminal bock. The primary side power source line is passed through the inside of the hollow pole 2 and electrically connected to an unshown power supply apparatus. The power supply apparatus includes a control apparatus (not shown in the drawings) that controls a lighting circuit of the LED optical units 6, 6, . . . to control the lighting thereof. The power supply apparatus is housed inside an unshown box-shaped case, and is mounted on the outer surface of the pole 2 at a height above ground level that allows a worker to easily perform operations relating to the power supply apparatus above ground level.

Next, the action of the lighting apparatus 1 will be described.

When the LED modules 6*a* of the LED optical units 6, 6, . . . are supplied with electricity from the power source lines of a plurality of power source systems, each LED module 6*a*, for example, emits white light. The white light is reflected by the upper and lower pair of flat mirrors 6*c* and 6*d* and the right and left pair of side mirrors 6*e* and 6*f* and is irradiated to the translucent plate 5 side from the irradiation opening 6*g*. The white light is transmitted through the translucent plate 5 and is irradiated onto the road that is the illumination object.

Since the upper and lower pair of flat mirrors 6*c* and 6*d* are arranged approximately parallel to each other, the light reflected by the upper and lower pair of flat mirrors 6*c* and 6*d* is irradiated mainly in the longitudinal direction of the road substantially without spreading. In contrast, since the side curved mirrors 6*e* and 6*f* expand in the width direction of the road, the white light that is reflected by the right and left pair of side curved mirrors 6*e* and 6*f* is mainly irradiated in the width direction of the road. Accordingly, the illuminating angle at which light is irradiated in the width direction of the road can be controlled by means of the expanding angle of the left and right pair of side curved mirrors 6*e* and 6*f*.

More specifically, since the lighting apparatus 1 can control an illuminating angle in the width direction of the road for each LED optical unit 6, leaking light can be reduced by appropriately controlling the distribution of light in the width direction of the road that is leaking light for each LED optical unit 6. Thus, the rate of illumination with respect to an area to be illuminated can be improved and a target illuminance can be obtained with low power.

Further, by appropriately adjusting the shape or expanding angle of the side curved mirrors 6*e* and 6*f* of the LED optical unit 6, primary reflected light that has been reflected by the side curved mirrors 6*e* and 6*f* can be caused to converge within the width of the road. In addition, when the height of the lighting apparatus 1 above ground is arranged at, for example, a height of ten meters above ground by means of the height of the pole 2, the primary reflected light can also be caused to converge inside a range of a height of seven meters above ground.

Furthermore, the irradiation points in the road width direction of the plurality of LED optical units 6, 6, . . . can be made the same, and the irradiating directions can be allocated so as to obtain an equal distribution of brightness in the longitudinal direction of the road.

As shown in FIG. 8, since the lighting apparatus 1 includes both the inner side LED optical units 6in, 6in, . . . for proximate radiation (as proximate irradiation optical units) and the LED optical units 6out, 6out, . . . for distant radiation (as distant irradiation optical units) to an area farther away than the proximity of the lighting apparatus 1, both the proximity of the lighting apparatus 1 and an area at a farther distance than the proximity of the lighting apparatus 1 can be illuminated. Moreover, as shown in FIG. 1, the lighting apparatus 1 includes two sets of the LED optical units 6, 6, . . . in which each set contains LED optical units 6, 6, . . . for proximate radiation and for distant radiation that are respectively arranged on the left and right (top and bottom in FIG. 1) of the axis of symmetry (central axis O). Furthermore, the two sets are symmetrically arranged on the left and right and, the sets are arranged in non-parallel to an opening plane of the opening and are arranged in non-parallel to each other. As shown in FIG. 8, the sets are preferably arranged so as to be facing in an inclined manner in a truncated chevron shape with respect to the translucent plate 5 of the irradiating portion. Hence, the distribution of light that is irradiated to outside from the translucent plate 5 can be spread in a truncated chevron shape to expand the illumination region, and since the lights that are irradiated from the right and left sides are caused to intersect (cross) in the proximity of the underneath of the translucent plate 5, the brightness of the irradiation in the proximity of the lighting apparatus 1 can be improved.

Furthermore, since the LED optical units 6in, 6in, for proximate radiation are arranged above, that is, on an upper level with respect to, the LED optical units 6out, 6out, . . . for distant radiation, the LED optical units 6in, 6in, . . . for proximate radiation are heated by heat dissipated from the LED optical units 6out, 6out, . . . for distant radiation. Consequently, the LED optical units 6in, 6in, . . . for proximate radiation are liable to be heated to a higher temperature than the outer side LED optical units 6out, 6out, . . . and the optical output thereof is liable to decrease. However, because the LED optical units 6in, 6in, . . . for proximate radiation are used for illumination in the proximity of the lighting apparatus 1, the influence of such a decrease in optical output is small. Moreover, since the respective lights that are irradiated from the LED optical units 6, 6, . . . that are arranged on the left and right intersect, the brightness in the proximity of the lighting apparatus 1 is originally strong. Therefore, even if the optical output of the LED module 6*a* of the LED optical units 6in and 6in for proximate radiation decreases due to an increase in temperature, the influence of a decrease in the irradiation light in the proximity of the lighting apparatus 1 is even less.

In contrast, since the LED optical units 6out, 6out, . . . for distant radiation from which a high optical output is required are position below the LED optical units 6in, 6in, . . . for proximate radiation, the degree to which the LED optical units 6out, 6out, . . . for distant radiation are heated by heat dissipated from the LED optical units 6in, 6in, . . . for proximate radiation is low. Consequently, a decrease in the optical output thereof due to an increase in temperature can be suppressed to a low level.

Further, as shown in FIG. 1, in the LED optical units 6, 6, . . . , the upper and lower pair of flat mirrors 6*c* and 6*d* in FIG. 1 are arranged side by side so as to be adjacent in the longitudinal direction of the road. Hence, it is possible to expand the length in the longitudinal direction of the distribution of light thereof that is irradiated in the longitudinal direction of the road.

In addition, since the LED optical units 6in, 6in, . . . for proximate radiation and the LED optical units 6out, 6out, . . . for distant radiation are arranged in two upper and lower levels, it is possible to decrease the size of the planar shape of the case main body 3 and the top cover 4 that house the aforementioned LED optical units. Further, since a small and light LED that has a high output is used as a light source, the LED optical units can be made smaller, lighter and with a higher output by a corresponding amount.

Furthermore, if rain, snow, dirt, dust, dead leaves or the like fall onto the upper surface of the top cover 4, they are caused to slip off from the upper surface by the downward curved surface in the front-to-rear direction or the downward curved surface in the width direction of the top cover 4 as shown by the arrows in FIG. 3. Hence, the accumulation of rain, snow, dirt, dust, dead leaves or the like on the upper surface of the top cover 4 can be reduced. As a result, maintenance can be reduced.

In addition, since the surface area of the top cover 4 is increased by formation thereon of the pair of mountain-like protrusions 4*c* and 4*d* and the curved concave portion 4*e*, the heat dissipation properties thereof can be improved. Further, the heat dissipation properties can be enhanced by facilitating natural convection inside the light source chamber 3*c* within the top cover 4.

Although a case in which ten of the LED optical units 6, 6, . . . are provided is described according to the above embodiment, the number of the optical units 6 is not limited thereto, and the number of LED optical units may be more than ten or less than ten. Further, although the distribution of LED optical units on the left and right of the axis of symmetry O is not limited to five units on each side, a bilaterally symmetrical arrangement is preferable.

In addition, since each LED optical unit 6 is unitized by integrally assembling the LED module 6*a*, the flat mirrors 6*c* and 6*d*, the side curved mirrors 6*e* and 6*f*, the ceramic substrate 6*b*, the unit support plate 9 and heat sinks 9*c* and 9*c*, and is detachably provided on the top cover 4, each LED optical unit 6 can be individually replaced. Therefore, even if a malfunction occurs in a section of the LED optical unit 6, the costs can be reduced in comparison to replacing the entire lighting apparatus 1. Further, it is possible to easily correspond to various light distribution requirements by changing the shape of the flat mirrors 6*c* and 6*d* or the side curved mirrors 6*e* and 6*f*. Also, since each of the LED optical units 6, 6, . . . includes heat sinks 9*c* and 9*c*, heat dissipation properties with respect to heat generation of LED chips can be improved. Furthermore, since the heat sinks 9c and 9c contact with the inner surface of the top cover 4 in a manner that enables heat transfer therebetween, heat can be dissipated to outside from the top cover 4 and thus the heat dissipation properties can be further enhanced.

Moreover, when the LED module 6a is housed inside a housing recess of the ceramic substrate 6b that has excellent heat transfer properties, the heat dissipation properties with respect to heat generation of the LED module 6a can be enhanced. Further, since the ceramic substrate 6b that is generally fragile is elastically supported by the pair of plate springs 8a and 8b without being screwed thereto, damage of the ceramic substrate 6b can be reduced. Furthermore, because the light emitting surface 6aa of the LED module 6a is approximately flush with the front face 6bc (surface) of the ceramic substrate 6b or is somewhat forward thereof, or because the front face 6bc of the ceramic substrate 6b and the front face 9a of the unit support plate 9 are approximately flush with each other, light emitted from the LED module 6a can be reflected by the front face of the white ceramic substrate 6b and the side curved mirrors 6e and 6f, and hence the reflective efficiency can be improved by that amount.

In addition, as shown in FIG. 3, the outer surface shape of the top cover 4 is formed in a streamline shape that can decrease air resistance with respect to airflows that flow along the outer surface in the width direction and longitudinal direction. Hence, for example, the wind pressure with respect to the lighting apparatus 1 that is arranged at a height of ten meters above the ground can be reduced. As a result, the strength of the pole 2 or 2a that supports the lighting apparatus 1 as well as the support strength of the embedded foundation thereof can be enhanced. In this connection, one of the lateral hole for pole insertion 3m and the vertical hole for pole insertion 3h is hermetically sealed by an unshown closure plate when not in use.

Figure 15:
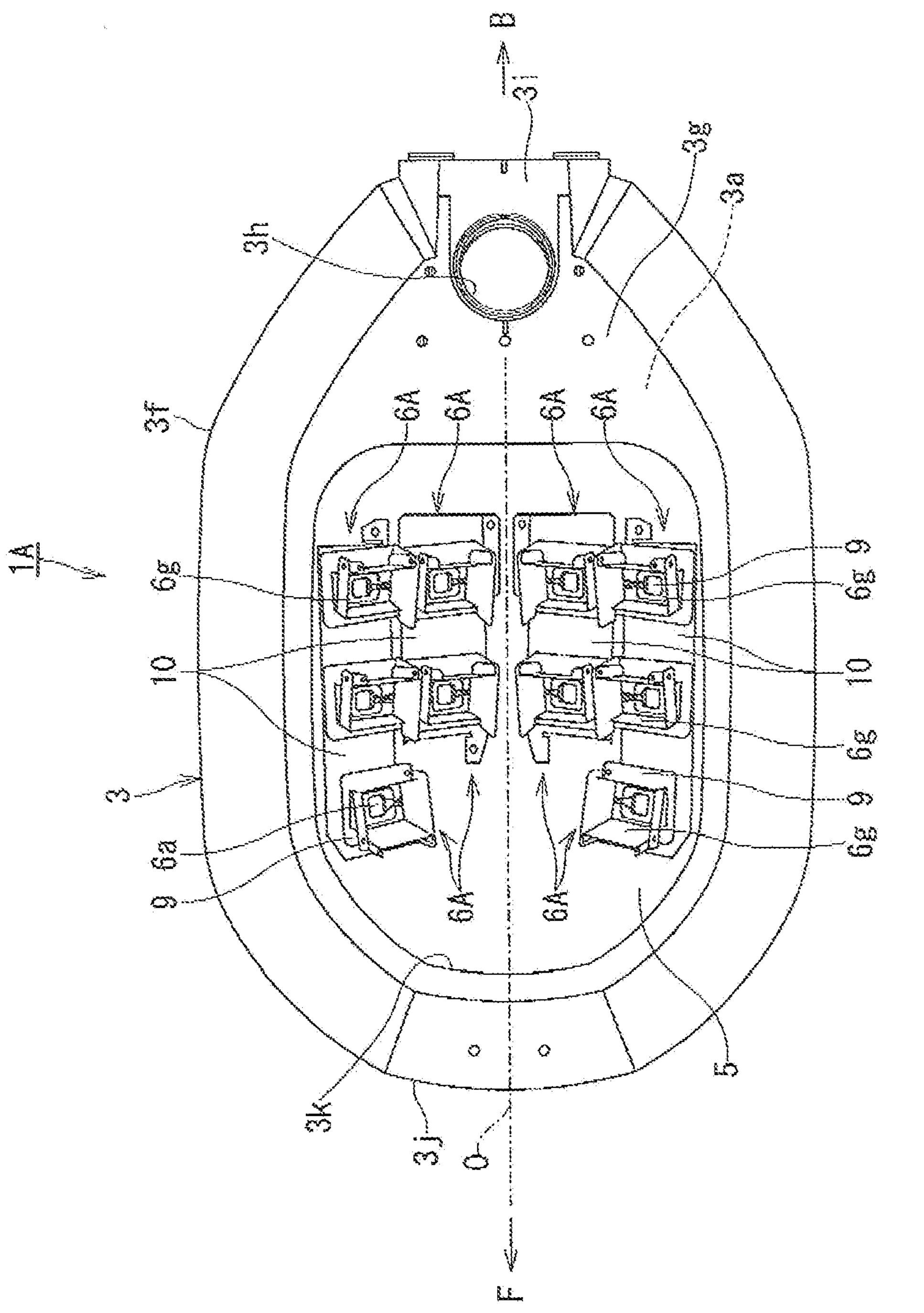
FIG. 15 is a bottom view of an lighting apparatus according to a second embodiment of the present invention.

FIG. 15 is a bottom view of an lighting apparatus 1A according to a second embodiment of the present invention. The lighting apparatus 1A is a road light that is favorably used on a road such as a cross-shaped intersection. The main feature of the lighting apparatus 1A is that the LED optical units 6 according to the lighting apparatus 1 of the first embodiment described above are replaced by second LED optical units 6A in the lighting apparatus 1A.

Figure 18:
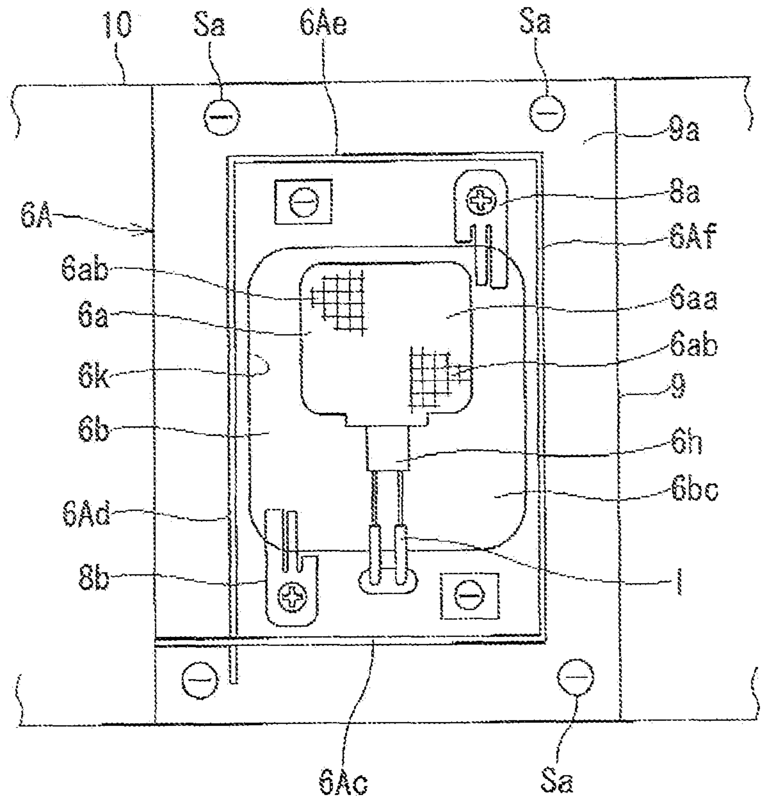
FIG. 18 is a plan view of an LED optical unit shown in FIG. 15 to FIG. 17.
Figure 19:
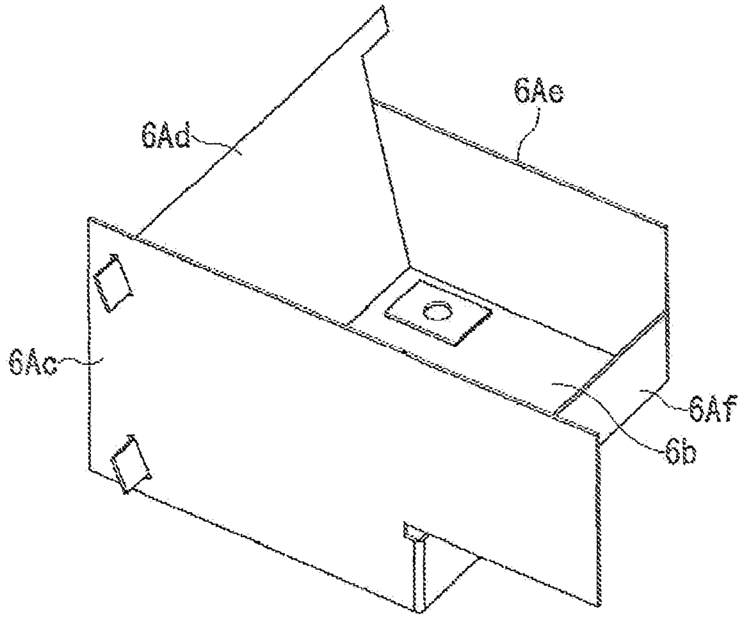
FIG. 19 is a perspective view of a reflector shown in FIG. 15 to FIG. 17.
Figure 21:
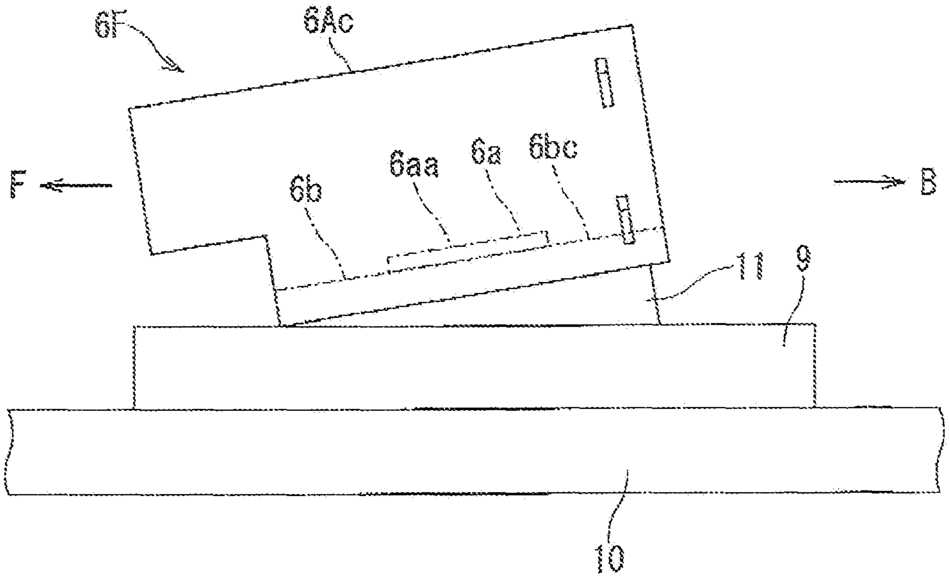
FIG. 21 is a side view of a forward irradiation LED optical unit shown in FIG. 15 to FIG. 17.
Figure 22:
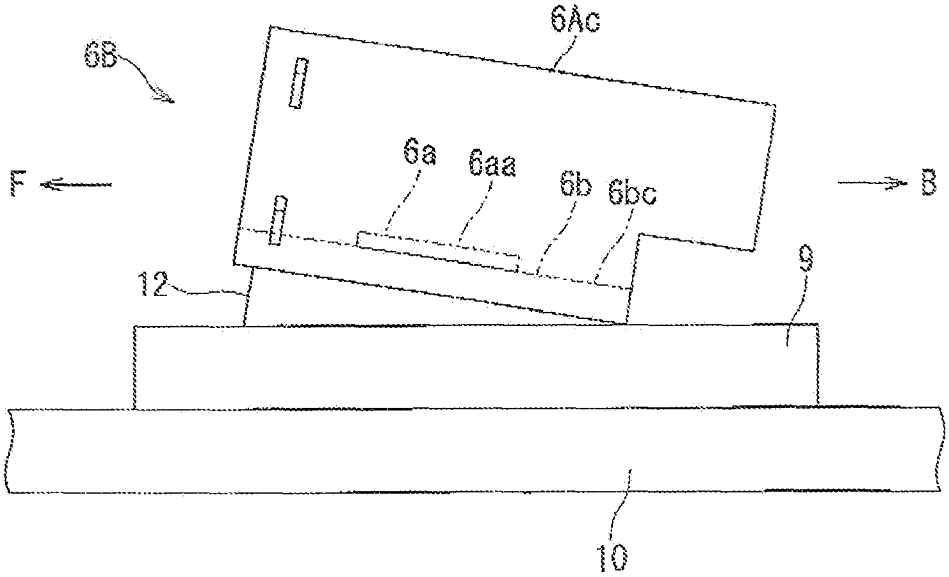
FIG. 22 is a side view of a backward irradiation LED optical unit shown in FIG. 15 to FIG. 17.

Relative to the above described LED optical unit 6, in the second LED optical unit 6A the flat mirrors 6c and 6d and the side curved mirrors 6e and 6f of the LED optical units 6 are replaced by reflection mirrors 6Ac, 6Ad, 6Ae, and 6Af on four faces as shown in FIG. 19. The second LED optical unit 6A also includes a forward irradiation LED optical unit 6F as shown in FIG. 21, and a backward irradiation LED optical unit 6B as shown in FIG. 22. Apart from these main features, the second LED optical unit 6A is approximately the same as the above described LED optical unit 6. Hence, in FIG. 15 to FIG. 23, the same or corresponding portions are denoted by like reference numerals, and part of the description thereof is omitted below.

More specifically, as shown in FIG. 15, a plurality of the second LED optical units 6A, 6A, . . . are aligned in a plurality of rows, for example, in FIG. 15, four horizontal rows, and housed inside the case main body 3.

A required number, for example, five, of the second LED optical units 6A, 6A, . . . are symmetrically arranged on the left and right sides (top and bottom in FIG. 15), respectively, taking the central axis O that passes through the center of the four rows in the front-to-rear direction (the left-to-right direction in FIG. 15) of the case main body 3 as an axis of symmetry.

The second LED optical units 6A, 6A, . . . on each side are, for example, arranged so that a required number, for example, two, of the second LED optical units 6A, 6A, . . . are arranged in parallel in the axial direction of the central axis on an inner side "in" (central axis O side) of the arrangement, and on an outer side "out" thereof, a required number, for example, three, of the second LED optical units 6A, 6A, . . . are arranged in parallel in the axial direction of the central axis O. With respect to the LED optical units 6A, 6A, . . . that are arranged on the left and right sides, by disposing the irradiation openings 6g thereof in a crossing manner with respect to each other towards the opposite sides in the left-to-right direction, the lights irradiated from the second LED optical units 6A, 6A, . . . are caused to intersect below the second LED optical units 6A, 6A, . . . .

Figure 23:
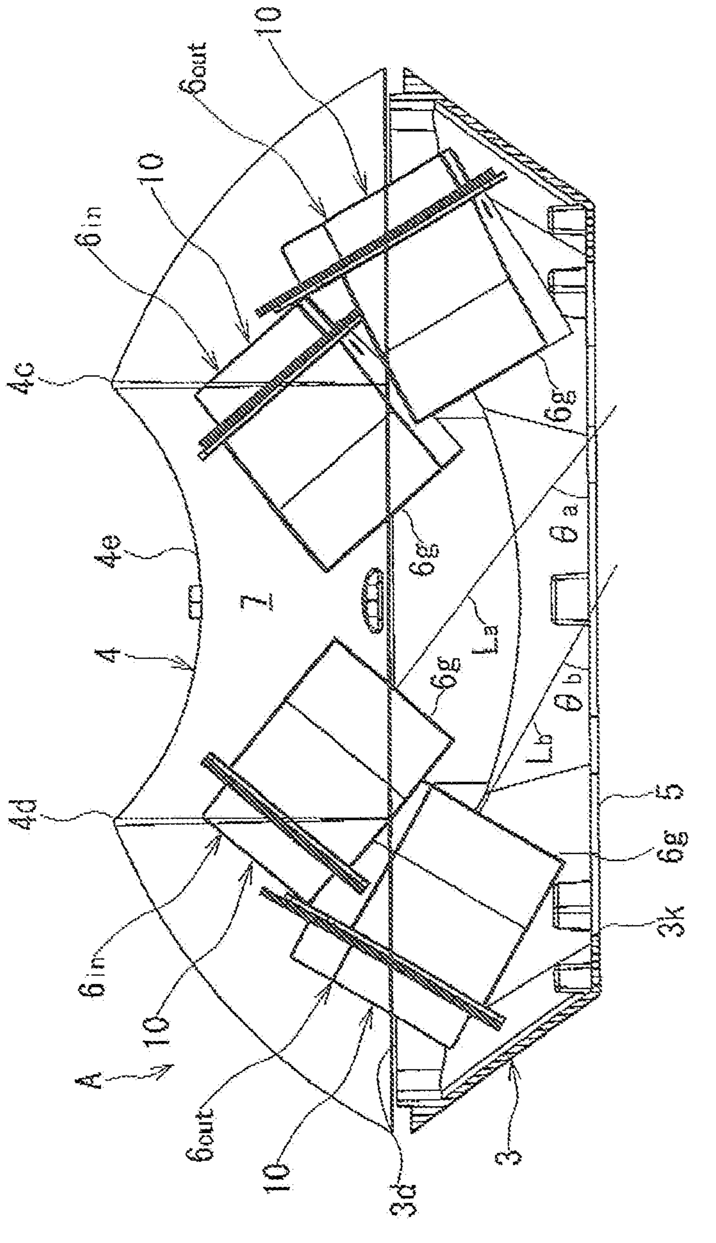
FIG. 23 is a sectional view along a line XXIII-XXIII in FIG. 17.

Further, as shown in FIG. 23, when the top cover 4 and the case main body 3 are joined together, the inner space thereof is formed into a light source housing portion 7 that houses a plurality of the second LED optical units 6A, 6A, . . . . Inside the light source housing portion 7, each LED optical unit 6in of the array on the inner side is disposed above, that is, at a higher position than (upper level), each LED optical unit 6out of the array on the outer side. The inner side and outer side LED optical units 6in and 6out that are arranged on the left and right in FIG. 23 are aligned in a truncated chevron shape that expands like a folding fan in the downward direction in the drawing, and are aligned in an intersecting truncated chevron shape. Further, the irradiated lights from the respective LED optical units 6in and 6out of the arrays on inner and outer sides on the left and right intersect at a position below these LED optical units 6in and 6out in the drawing. In order to irradiate light in the proximity of the lighting apparatus 1A, each LED optical unit 6in on the inner side is fixed in an inclined state so that a light axis La of the irradiation light thereof is at a required angle θa (for example, 50°) with respect to the surface of the translucent plate 5. Further, in order to irradiate light to an area farther away than the proximity of the lighting apparatus 1A, each LED optical unit bout on the outer side is fixed in an inclined state so that a light axis Lb of the irradiation light thereof is at a required angle θb (for example, 60°) with respect to the surface of the translucent plate 5.

As shown in FIG. 18, in each LED optical unit 6A, an LED (light emitting diode) module 6a, a ceramic substrate 6b that is one example of a support substrate thereof, and the four sides at the outer circumference of the ceramic substrate 6b are surrounded in a rectangular shape by reflection mirrors 6Ac, 6Ad, 6Ae, and 6Af. The reflection mirrors 6Ac, 6Ad, 6Ae, and 6Af are formed by an aluminum metal plate or the like. The inner surface of each of the reflection mirrors 6Ac, 6Ad, 6Ae, and 6Af is formed as a reflective surface by subjecting the inner surface to a mirror finishing process.

As shown in FIG. 19, the reflection mirrors 6Ac to 6Af are formed so that the shapes and heights of the reflection mirrors are different to each other. For example, among the pairs of reflection mirrors that face each other, i.e., 6Ac and 6Ae, and 6Ad and 6Af, one reflection mirror is lower than the other. In this example, 6Ae and 6Af are lower than 6Ac and 6Ad, respectively (6Ae<6Ac, 6Af<6Ad). Thus, light that is reflected by the reflection mirrors 6Ac and 6Ad that have the higher heights is not reflected again by the facing reflection mirrors 6Ac and 6Af, respectively and is irradiated upward thereof so that the light is irradiated to a farther area.

Figure 16:
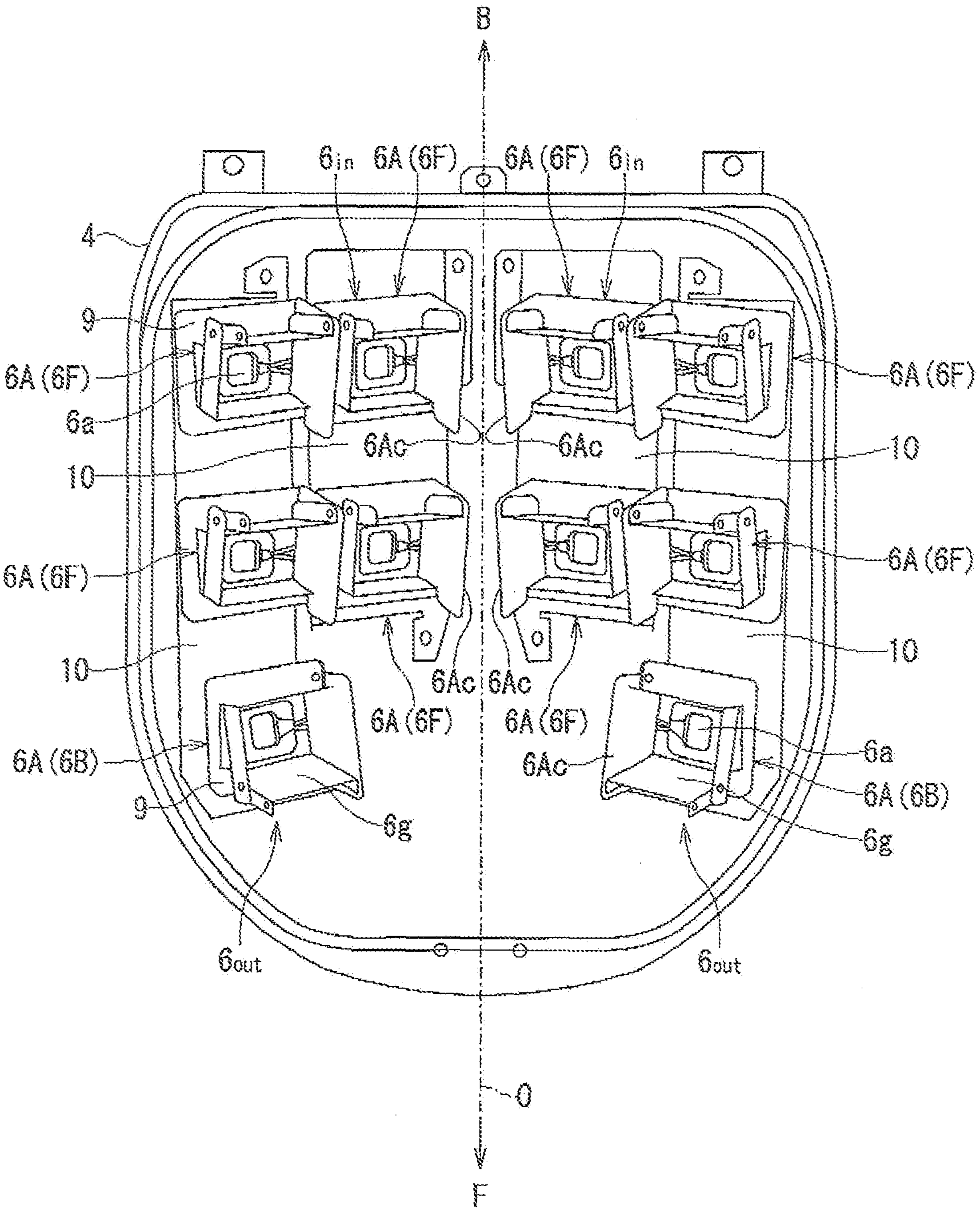
FIG. 16 is a plan view of the inner surface of a top cover of the lighting apparatus shown in FIG. 15.

For this purpose, as shown in FIG. 15 and FIG. 16, in each second LED optical unit 6A, the highest reflection mirror 6Ac among the reflection mirrors 6Ac to 6Ad is arranged at a reflective surface position that is approximately parallel to the central axis O (axis of symmetry) and is also located on the central axis O side in each LED optical unit 6A. Consequently, light can be irradiated further in the outward direction in the left-to-right direction in FIG. 15 and FIG. 16.

As shown in FIG. 18, the LED module 6*a*, for example, includes a COB (chip on board) type pseudo-white (blue-yellow system) LED bare chip 6*ab* as a light emitting element. More specifically, the LED module 6*a* includes a required number (for example, 196) of LED bare chips 6*ab* that emit blue light. The LED bare chips 6*ab* are directly mounted on a printed circuit board on which a circuit is formed, and arranged in a plurality of rows (14 rows, for example) and a plurality of columns (14 columns, for example). Subsequently, a resin containing phosphors that emit yellow light is applied onto the LED bare chips 6*ab*, the resulting structure is sealed by a silicone resin. The LED module 6*a* constructed in this manner is adhered by, for example, a silicone resin or the like on an approximately center section of a front face 6*bc* of the ceramic substrate 6*b*.

The LED module 6*a* is adhered by means of a silicone resin as an adhesive to the front face of the ceramic substrate 6*b* in a state in which the light emitting surface 6*aa* thereof is caused to protrude somewhat more frontward than the front face of the ceramic substrate 6*b* to be exposed to outside. The light emitting surface 6*aa* of the LED module 6*a* is configured to be at a position that protrudes somewhat more frontward than the front surface of the white ceramic substrate 6*b* in this fixed state.

As shown in FIG. 18, in the second LED optical unit 6A, the LED module 6*a* is arranged in an eccentric manner towards the low reflection mirror 6Ae that faces the reflection mirror 6Ac that has the highest height. The reason for this is that, by arranging the LED module 6*a* that is the light source away from the highest reflection mirror 6Ac that can irradiate reflected light farther than the low reflection mirror 6Ae, it is possible to reduce the reflection angle at the reflection mirror 6Ac and to extend the irradiation distance of reflected light from the reflection mirror 6Ac.

Figure 20:
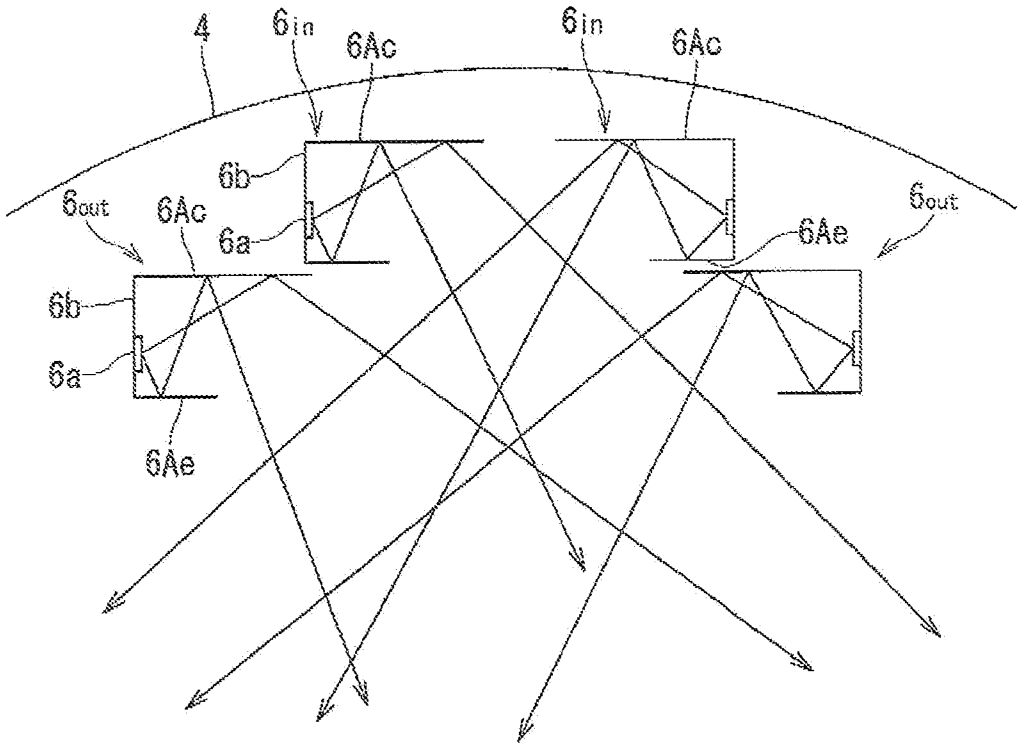
FIG. 20 is a schematic diagram that illustrates a reflection action of the optical unit shown in FIG. 15 to FIG. 17.

FIG. 20 is a schematic diagram that illustrates the reflection action of the reflection mirror 6Ac with a high height and the reflection mirror 6Ae with a lower height than the reflection mirror 6Ac that faces the reflection mirror 6Ac in the LED optical unit 6A. As shown in FIG. 20, when light of the LED module 6*a* is reflected by the reflection mirror 6Ae that has a low height, the reflected light is reflected again by the reflection mirror 6Ac that has a high height that faces the reflection mirror 6Ae and is irradiated to the proximity of the relatively inner side (in) in the width direction (the left-to-right direction in FIG. 20) of the top cover 4. According to this proximate irradiation, the luminous flux decreases somewhat due to reflection loss because the light emitted from the LED module 6*a* is reflected twice, namely, at the low reflection mirror 6Ae and at the high reflection mirror 6Ac. However, since the light is irradiated in the proximity of the lighting apparatus 1A, the light intensity is sufficient for the proximate irradiation.

In contrast, when light from the LED module 6*a* is reflected at the reflection mirror 6Ac that has a high height, because the high reflection mirror 6Ac is at a farther distance from the LED module 6*a* than the reflection mirror 6Ae, the angle of incidence of light incident on the high reflection mirror 6Ac decreases by a corresponding amount. Consequently, the light is reflected at a small reflection angle by the reflection mirror 6Ac and is irradiated to a distant area outside the width direction of the top cover 4. In this case, since the light is reflected only once at the reflection mirror 6Ac, the luminous flux generated by the reflection is stronger than the proximate irradiation by a corresponding amount, and thus the reflected light can be irradiated a correspondingly farther distance.

The plurality of LED optical units 6A are symmetrically arranged on the left and right in the drawings with respect to the central axis O in the width direction that extends in the longitudinal direction (front-to-rear direction in FIG. 20) of the center in the width direction within the top cover 4. Hence, the uniformity ratio of illuminance on a horizontal plane directly under the top cover 4 in FIG. 20 can be improved.

Figure 17:
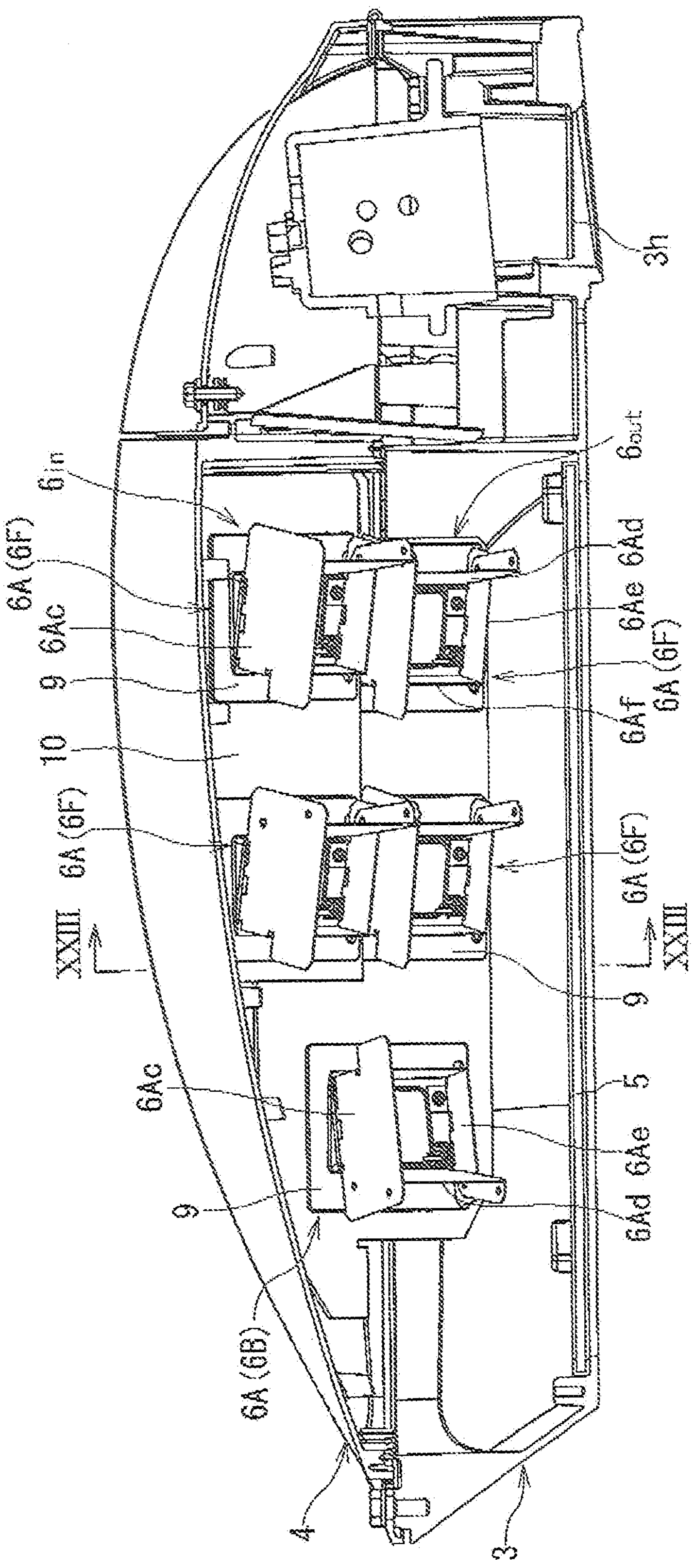
FIG. 17 is a cross-sectional side view of the lighting apparatus shown in FIG. 15.

Further, the plurality of LED optical units 6A and 6A that are arranged on one side, respectively, with respect to the central axis O in the width direction of the top cover 4 are arranged on two upper and lower levels in the drawings, and there is a difference in level between adjacent LED optical units 6A and 6A in the width direction of the top cover 4 (see FIG. 17). Hence, it is possible to prevent or lessen the occurrence of a shadow caused by light irradiated from the LED optical units 6A and 6A being blocked by the other LED optical unit 6A.

Although the present schematic diagram illustrates the reflection actions of the reflection mirrors 6Ac and 6Ae, the reflection mirrors 6Ad and 6Af of the LED optical unit 6A can likewise perform distant irradiation and proximate irradiation by means of reflection mirrors of different heights.

In a state in which the back surface of the ceramic substrate 6*b* is arranged inside the fitting opening portion 6*k* formed in the front face 9*a* of the unit support plate 9 that is formed in the shape of a metal rectangular flat plate made of aluminum or the like that is shown in FIG. 18, the front face of the ceramic substrate 6*b* is elastically supported by the upper and lower pair of plate springs 8*a* and 8*b* that are an example of a presser that are screwed into the unit support plate 9. More specifically, the ceramic substrate 6*b* is elastically sandwiched in the thickness direction by the upper and lower pair of plate springs 8*a* and 8*b* and the unit support plate 9.

The upper ends and lower ends of the plate springs 8*a* and 8*b* are fixed by screwing to the upper and lower ends of the unit support plate 9, respectively. A plurality of the LED optical units 6 that are constructed in this manner are detachably attached by bolts or screws Sa or the like to a unit mounting plate 10 that is formed in a band-plate shape. On the unit mounting plates 10, for example, two of the second inner side LED optical units 6Ain (upper level) are arranged side by side and, for example, three of the outer side LED optical units 6Aout (lower level) are arranged side by side. The unit mounting plates 10 are fixed at required places to the inner surface of the aforementioned top cover 4 by being firmly adhered by screwing to a mounting boss that is integrally provided in a protruding condition on the inner surface of the top cover 4. More specifically, all of the second LED optical units 6A, 6A, . . . are detachably fixed to the inner surface of the top cover 4. At the time of fixing, at least one part of the unit support plate 9 of the second LED optical units 6A, 6A, . . . is brought in contact directly with the inner surface of the top cover 4 or is brought in contact with the inner surface of the top cover 4 through a heat dissipating body such as a metal plate with excellent heat dissipation properties or a heat pipe to thereby enhance the heat dissipation properties of the lighting apparatus 1A.

A plurality of power source systems, for example, two systems, are provided as the power source systems of the second LED optical units 6A, 6A, . . . that are constructed in the above manner. More specifically, a plurality of power source systems may be respectively provided for the left and right sides of the lighting of the second LED optical units 6A, 6A, . . . when taking the central axis O as an axis of symmetry. Accordingly, even if there is a malfunction in one of the systems, as long as there is not a malfunction in the other system it is possible to light the other second LED optical units 6A, 6A, . . . on the left and right, and thus a situation in which all of the second LED optical units 6A, 6A, . . . do not emit light can be prevented.

The second LED optical units 6A include a forward irradiation LED optical unit 6F shown in FIG. 21 and a backward irradiation LED optical unit 6B shown in FIG. 22. As shown in FIG. 21, the forward irradiation LED optical unit 6F includes a wedge-shaped forward spacer 11 that causes a light emitting surface 6*aa* of the LED module 6*a* and a front face 6*bc* of the ceramic substrate 6*b* to incline in a forward direction F, that is, towards the opposite side of the pole 2 that is the support column. Preferably, the spacer 11 is made of a material that has excellent heat dissipation properties such as die-cast aluminum.

As shown in FIG. 16, the forward irradiation LED optical units 6F are arranged on the two upper and lower (inner and outer sides) levels at a rear portion of the case main body 3. Four left and right pairs of the forward irradiation LED optical units 6F, that is, a total of eight units 6F, are arranged thereon.

In contrast, as shown in FIG. 22, the backward irradiation LED optical unit 6B includes a wedge-shaped backward spacer 12 that is made of die-cast aluminum metal or the like that causes the light emitting surface 6*aa* of the LED module 6*a* and the front face 6*bc* of the ceramic substrate 6*b* to incline in a backward direction B. As shown in FIG. 16, the backward irradiation LED optical units 6B are arranged in left and right pairs at a front portion inside the case main body 3.

Figure 24:
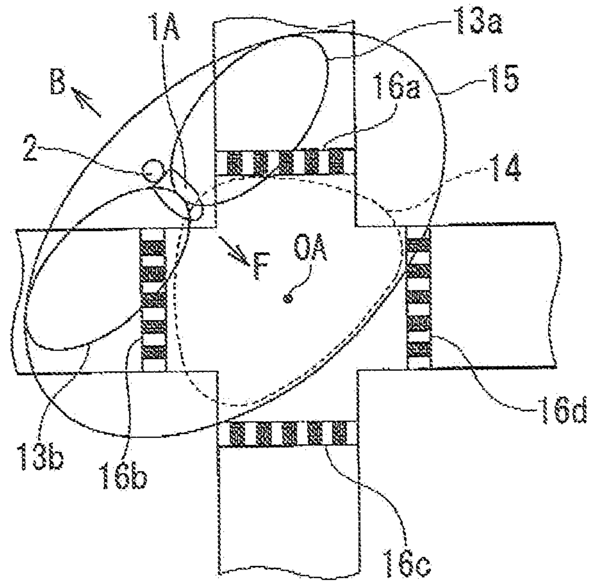
FIG. 24 is a view that illustrates light distribution characteristics when a single lighting apparatus shown in FIG. 15 to FIG. 22 is erected on the outer side of one corner of a cross-shaped intersection of a road.

FIG. 24 illustrates light distribution characteristics when a single lighting apparatus 1A according to the second embodiment constructed in this manner is, or example, erected on an outer side at a corner of a cross-shaped intersection of a road. The lighting apparatus 1A is erected so that the head thereof faces a center point OA of the road intersection.

The light distribution of the lighting apparatus 1A includes left and right backward light distributions 13*a* and 13*b* when light is irradiated in both the left and right directions in a backward direction B, respectively, by two backward irradiation LED optical units 6B and 6B on the left and right that are arranged at the front portion of the case main body 3, and a forward light distribution 14 when light is irradiated in a forward direction F by a total of eight forward irradiation LED optical units 6F, 6F, . . . that comprise four left and right pairs that are arranged at the rear portion of the case main body 3.

Accordingly, the light distribution of the lighting apparatus 1A is an approximately elliptic-shaped combined light distribution 15 which combines the approximately triangular forward light distribution 14 and the backward light distributions 13*a* and 13*b*. The combined light distribution 15 can illuminate the roads at the intersection at which the lighting apparatus 1A is erected in an approximately elliptical shape that is centered on one corner, and the intersection center OA and an area including two pedestrian crossings 16*a* and 16*b* at which the lighting apparatus 1A is installed can be illuminated.

Figure 25:
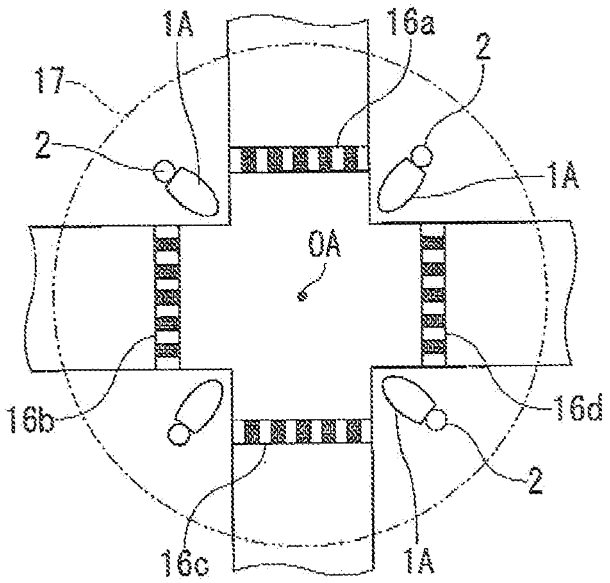
FIG. 25 is a view that illustrates combined light distribution characteristics when four of the lighting apparatuses shown in FIG. 15 to FIG. 22 are erected at a cross-shaped intersection of a road.

FIG. 25 shows a combined light distribution 17 when four of the lighting apparatuses 1A, 1A, . . . are erected at the corners of the aforementioned intersection. According to the combined light distribution 17, an area within a radius including a region somewhat to the back of the four lighting apparatuses 1A, 1A, . . . from the intersection center OA can be illuminated, and all of four pedestrian crossings 16*a* to 16*d* of the intersection can be illuminated.

Figure 26:
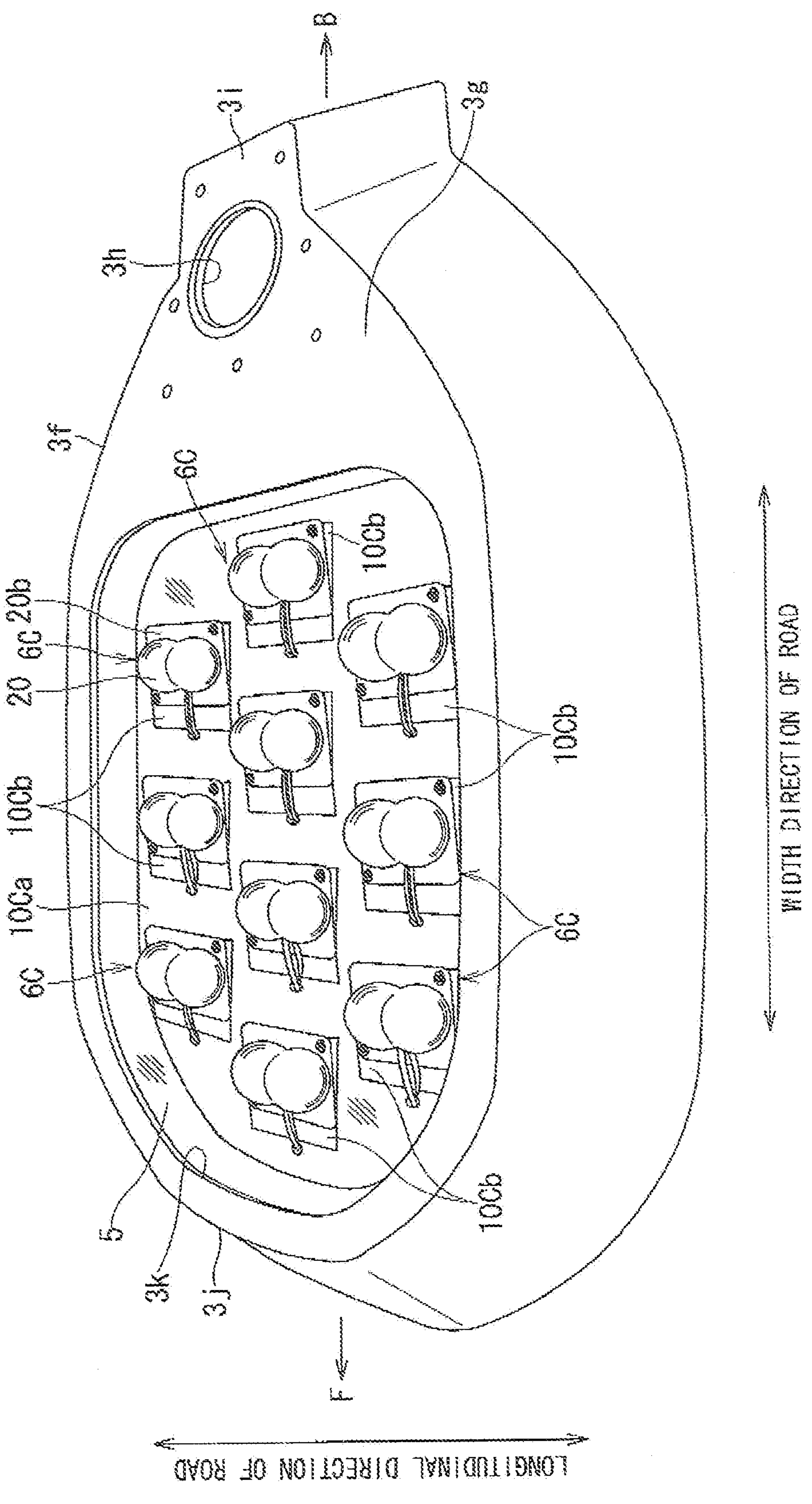
FIG. 26 is a bottom view of an lighting apparatus according to a third embodiment of the present invention.

FIG. 26 is a bottom view of an lighting apparatus 1C according to a third embodiment of the present invention. The lighting apparatus 1C is an lighting apparatus that can be used, for example, as a road light on a road such as a highway or an ordinary road or the like. A feature of the lighting apparatus 1C is that, relative to the lighting apparatus 1 according to the first embodiment described above, a third optical unit 6C is used in place of the LED optical unit 6.

Figure 30:
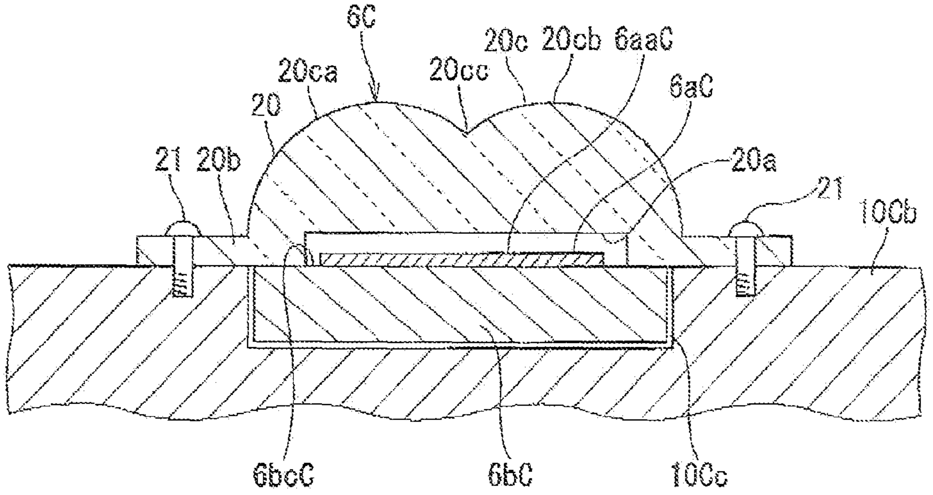
FIG. 30 is a sectional view along a line XXX-XXX in FIG. 27.

As shown in FIG. 30, in the third optical unit 6C, an LED (light emitting diode) module 6*a*C is integrally mounted on a ceramic substrate 6*b*C that is an example of a support substrate thereof.

Similarly to the first optical unit 6 shown in FIG. 10, the LED module 6*a*C, for example, includes a COB (chip on board) type pseudo-white (blue-yellow system) LED bare chip 6*ab* as a light emitting element. More specifically, the LED module 6*a*C includes a required number (for example, 196) of LED bare chips 6*ab* that emit blue light. The LED bare chips 6*ab* are directly mounted on a printed circuit board on which a circuit is formed, and arranged in a plurality of rows (14 rows, for example) and a plurality of columns (14 columns, for example). Subsequently, a resin containing phosphors that emit yellow light is applied onto the LED bare chips 6*ab*, the resulting structure is sealed by a silicone resin, and then adhered, for example, by a silicone resin on a substrate.

More specifically, as shown in FIG. 30, the LED module 6*a*C is adhered by a silicone resin to an approximately center section of a front face (upper face in FIG. 30) of the white ceramic substrate 6*b*C that is formed in the shape of a rectangular flat plate. Consequently, a light emitting surface 6*aa*C of the LED module 6*a*C is formed in a state in which the light emitting surface 6*aa*C protrudes somewhat more upward than a front face 6*bc*C (upper face in FIG. 30) of the ceramic substrate 6*b*C.

The third optical unit 6C and an irregularly shaped lens that covers approximately the entire front face (upper face) of the LED module 6*a*C are formed in an integrated manner in advance by adhering a bottom face in FIG. 30 of the irregularly shaped lens 20 onto the front face 6*bc*C of the third optical unit 6C by means of a silicone resin to thereby constitute the third optical unit 6C. More specifically, in the irregularly shaped lens 20, a concave portion 20*a* that accommodates approximately the entire LED module 6*a*C is formed in an opposing face (bottom face) that opposes the LED module 6*a*C. An outer peripheral edge portion (bottom face) of the concave portion 20*a* is adhered by means of a silicone resin on the ceramic substrate 6*b*C.

As shown in FIG. 26 to FIG. 30, in the irregularly shaped lens 20, a spherical lens portion 20*c* is provided in an integrally protruding manner on an approximately center section of a translucent lens base 20*b* in which a planar shape is a rectangular flat plate shape. In the spherical lens portion 20*c*, a planar shape is formed in an approximately oblong shape and, for example, a pair of spherical parts 20*ca* and 20*cb* that have a hemispherical shape are integrally formed at both end portions in the long diameter direction thereof. At an intermediate portion in the longitudinal direction of the spherical lens portion 20*c* that is a portion where the two spherical parts 20*ca* and 20*cb* are joined, a lens concave portion 20*cc* is integrally formed that is lower by a required height than the apexes of the spherical parts 20*ca* and 20*cb*. As shown by an arrow in FIG. 28, emitted light from the LED module 6*a*C is mainly emitted outward from respective ends in the longitudinal direction of the spherical lens portion 20*c*, and is also emitted in the transverse direction. Note that, in FIG. 28, reference character 1 denotes a lead wire of the third optical unit 6C.

Figure 27:
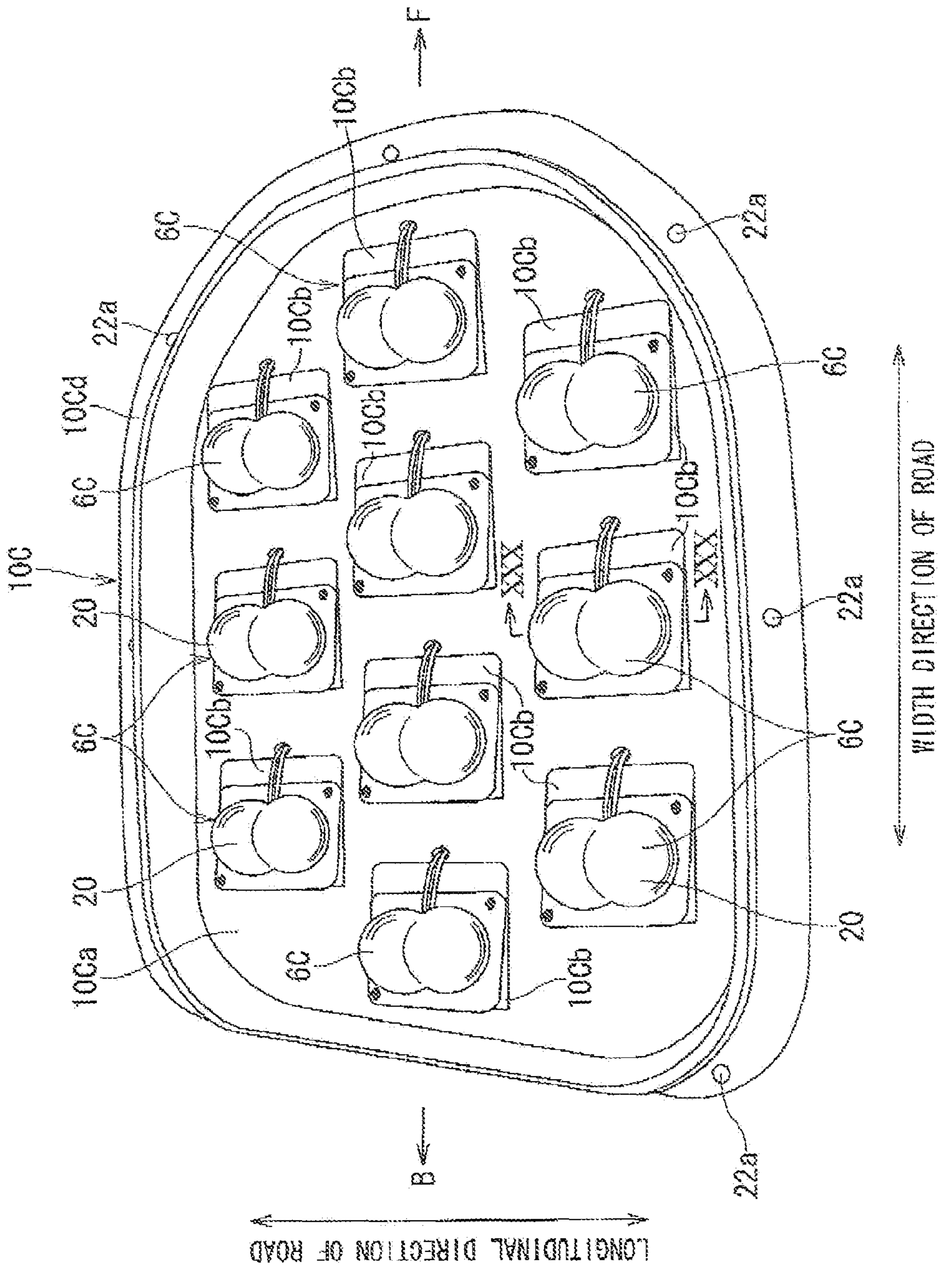
FIG. 27 is a perspective view that shows a state in which a plurality of the optical units are arranged on a unit mounting plate.
Figure 29:
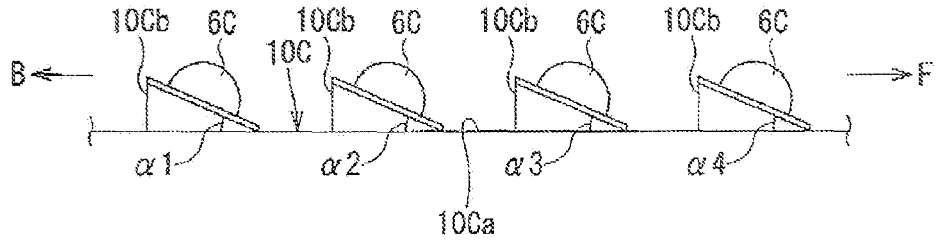
FIG. 29 is a side view of a plurality of the optical units that are arranged at an intermediate portion in a transverse direction of the unit mounting plate shown in FIG. 27.

As shown in FIG. 26 and FIG. 27, a plurality of the third optical units 6C constructed in this manner are fixed to a unit mounting plate 10C that, for example, is formed in the shape of a rectangular flat plate that is made of aluminum. More specifically, as shown in FIG. 29, a plurality of mounting step portions 10Cb, 10Cb, . . . to which a plurality of the third optical units 6C are mounted, respectively, are provided in a protruding condition on a front surface 10Ca of the unit mounting plate 10C. The mounting step portions 10Cb, 10Cb, . . . are integrally provided in a protruding condition, respectively, by press working or the like, so as to protrude to the front surface 10Ca side from a rear surface side of the unit mounting plate 10C. The mounting step portions 10Cb, 10Cb, . . . are respectively formed at angles of inclination α1, α2, α3, α4 that incline downward from a rear portion R side toward a front portion F side of the unit mounting plate 10C. The angles of inclination α1 to α4 are all equal at, for example, the mounting step portions 10Cb, 10Cb, . . . at three locations that are arranged in an approximately circular arc shape in a width direction of the unit mounting plate 10C, and for example, are formed as angles of 11° (α1), 9° (α2), 7° (α3), and 5° (α4), respectively, in the direction from the rear B side toward the front F side.

As shown in FIG. 30, a concave accommodating portion 10Cc configured to accommodate therein the ceramic substrate 6*b*C of the respective third optical units 6C is formed in each mounting step portion 10Cb. Each concave accommodating portion 10Cc is formed so that the depth dimension thereof is approximately equal to the plate thickness of the ceramic substrate 6*b*C. Hence, in a state in which the ceramic substrate 6*b*C is accommodated inside the concave accommodating portion 10Cc, the front face 6*bc*C (upper face in FIG. 30) of the ceramic substrate 6*b*C is approximately flush with the upper face in the drawing of the mounting step portion 10Cb.

Further, as shown in FIG. 26 and FIG. 27, the aforementioned plurality of mounting step portions 10Cb, 10Cb, . . . are arranged in, for example, approximately three rows and three columns (however, there are four columns in a middle row) on the unit mounting plate front surface 10Ca so as to be disposed in a staggered shape, and not in the shape of a straight line, along a width direction (transverse direction) of the case main body 3 and the unit mounting plate 10C, that is, along a longitudinal direction of a road. In other words, the plurality of mounting step portions 10Cb, 10Cb, . . . are mounted to the apparatus main body A in such a way that the portions 10Cb, 10Cb, . . . are disposed so as to be staggered relative to and to deviate from adjacent portions 10Cb, 10Cb, . . . in the width direction of the apparatus main body A or in the longitudinal direction of the apparatus main body A.

Screw insertion holes are respectively formed at, for example, a plurality of corner portions of the lens base 20*b* of each optical unit 6C. The respective optical units 6C are detachably mounted on the respective mounting step portions 10Cb of the unit mounting plate 10C by being fastened thereto by a plurality of fastening screws 21 and 21 that are inserted through the screw insertion holes.

Accordingly, as shown in FIG. 26 and FIG. 27, the third optical units 6C, 6C, . . . are arranged in a staggered shape along the width direction (transverse direction) of the case main body 3 and the unit mounting plate 10C, that is, along a longitudinal direction of a road. Consequently, the occurrence of a situation in which light irradiated in the width direction (transverse direction) of the case main body 3 from the optical units 6C, 6C, . . . , that is, in the longitudinal direction of a road, is blocked by other optical units 6C, 6C, . . . adjacent to the relevant optical unit 6C in the longitudinal direction of the road can be reduced, and an improvement in the irradiation efficiency can be expected.

Figure 31:
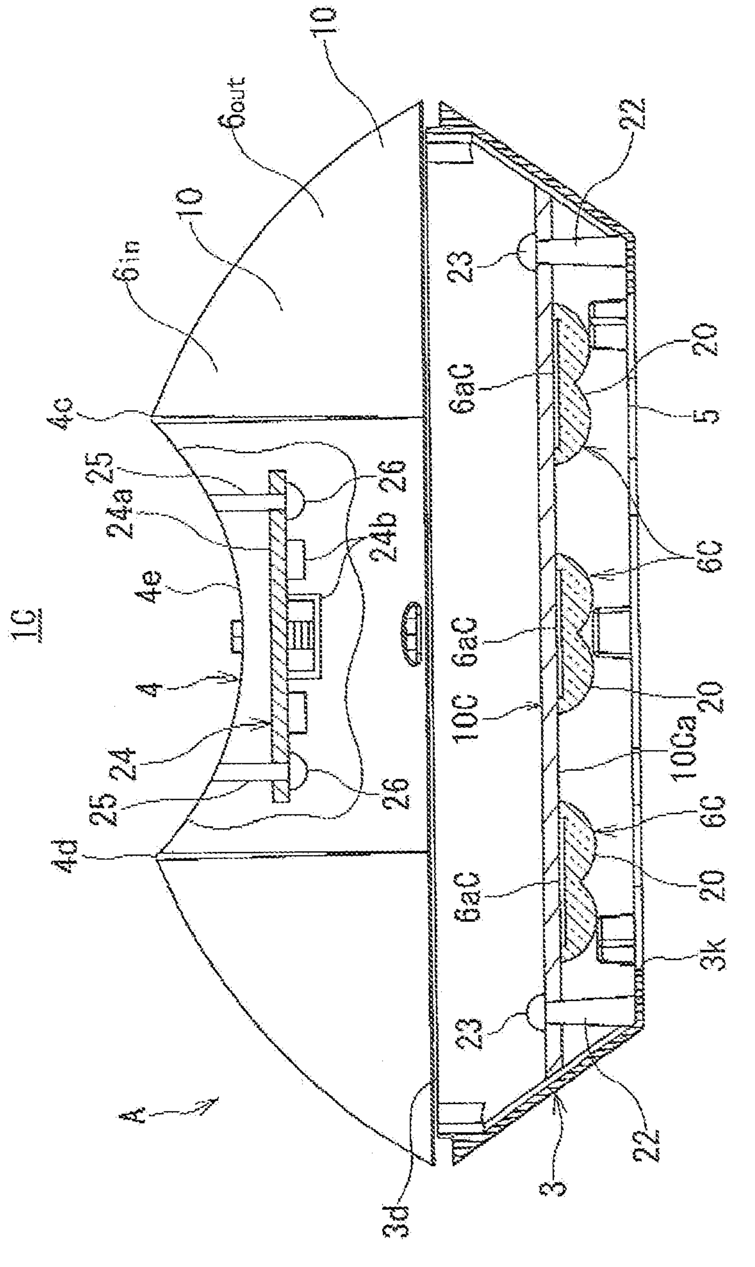
FIG. 31 is a view that shows a cross section of one portion (lower portion in FIG. 31) of the lighting apparatus when viewed from a front end that is the left end in FIG. 26, that shows a notch that is formed in a part of another portion (upper portion in FIG. 31) of the lighting apparatus.

As shown in FIG. 27, a flange 10Cd of a required width that rises by a required height is integrally provided in a protruding condition at an outer peripheral edge portion of the front surface 10Ca of the unit mounting plate 10C. Insertion holes for mounting 22*a*, 22*a*, . . . are formed with a required space therebetween in a circumferential direction in the flange 10Cd. As shown in FIG. 31, an upper end portion in the drawing of a plurality of columnar mounting bosses 22, 22, . . . formed at corner portions of a lower end in the drawing of the case main body 3 that forms one end portion of the apparatus main body A are inserted through the insertion holes for mounting 22*a*, 22*a*, . . . .

As shown in FIG. 31, because an upper end portion in the drawing of each mounting boss 22, 22, . . . is inserted through the respective insertion holes for mounting 22*a*, 22*a*, . . . of the unit mounting plate 10C, the unit mounting plate 10C can be fixed to the case main body 3 by fastening a set screw 23 in a screw hole of each mounting boss 22, respectively. A side face of the unit mounting plate 10C contacts against an inside surface of the case main body 3, and heat generated by the third optical units 6C, 6C, . . . is transferred to the case main body 3 through the unit mounting plate 10C and is released to the outside air from the outer surface of the case main body 3. In this connection, the translucent plate 5 comprising tempered glass is fitted in the opening 3*k* on the irradiation side of the case main body 3.

The case main body 3 is configured in the same manner as the case main body 3 according to the first and second embodiments described above, and the apparatus main body A is constituted by detachably mounting the top cover 4 that is made of a die-cast aluminum material on an upper end 3*d* of an opening of the case main body 3 by screwing or the like. The outer shape and configuration of the top cover 4 are formed in the same manner as the top cover 4 according to the first and second embodiments described above.

Figure 28:
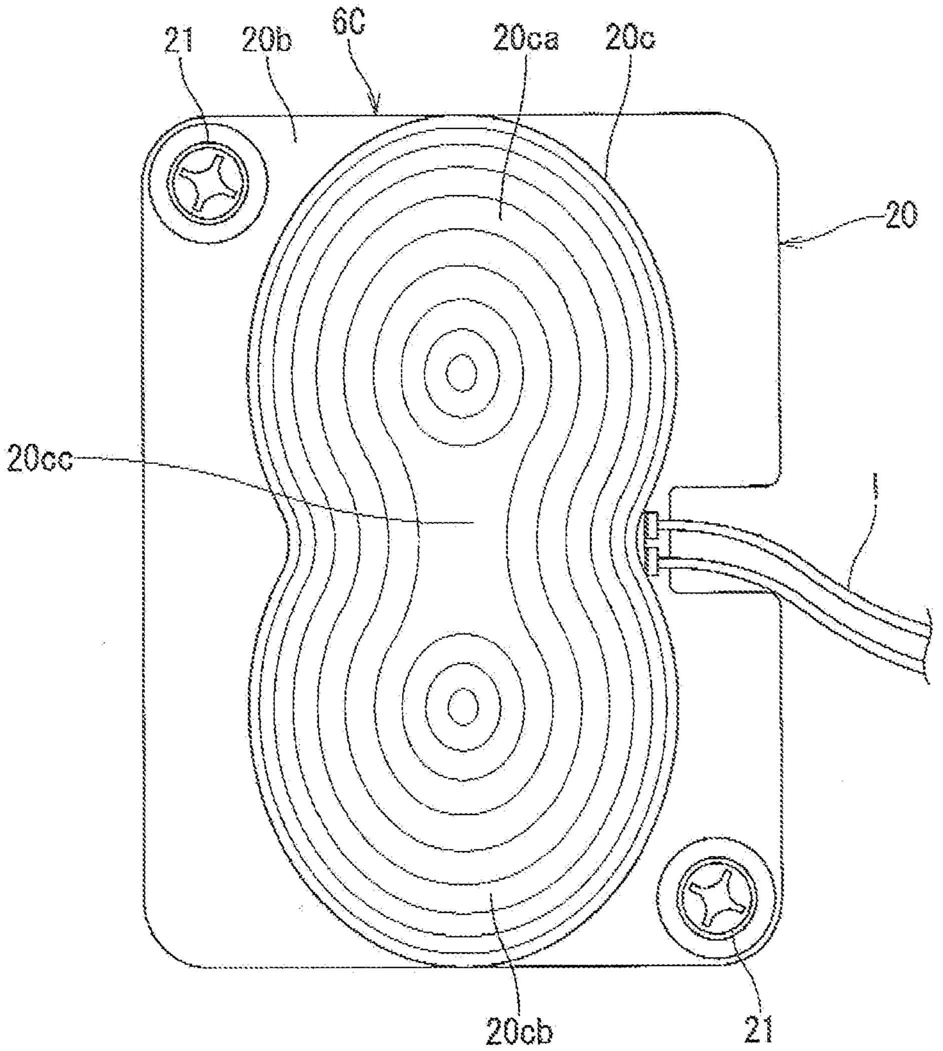
FIG. 28 is an enlarged plan view of the optical unit shown in FIG. 26 and FIG. 27.

As shown in FIG. 31, a power supply apparatus 24 that includes a lighting circuit (not shown in the drawing) that controls lighting and shutting off and the like of the third optical units 6C, 6C, . . . is mounted to, for example, an inner face of the concave portion 4*e* at the upper end in the drawing of the top cover 4. The output sides of an unshown power source line and control line that are connected to the power supply apparatus 24 are connected to the lead wire 1 as shown in FIG. 28 of each optical unit 6C, 6C, . . . . Further, the input sides of the aforementioned power source line and control line extend to the electricity chamber 3*a* at the rear end portion that is on the rearward R side of the case main body 3, and are respectively connected to a power source terminal and a control terminal that are omitted from the drawings.

The power supply apparatus 24 is constituted by mounting a plurality of electrical components 24*b*, 24*b* that comprise a lighting circuit or a power supply circuit or the like on at least one face of a substrate 24*a* comprising a rectangular flat plate made of aluminum that has heat dissipation properties and rigidity.

A plurality of insertion holes are formed in the substrate 24*a*. Lower end portions in FIG. 31 of a plurality of columnar mounting bosses 25, 25, . . . that are provided in a protruding condition on an inner face of the top cover 4 are inserted through the aforementioned plurality of insertion holes, respectively. The substrate 24*a* is fixed inside the top cover 4 by inserting the lower end portions in the drawing of the mounting bosses 25, 25, . . . into the insertion holes and screwing set screws 26, 26, . . . into screw holes in insertion tip portions thereof.

When the LED modules 6*a*C, 6*a*C, . . . of the third optical units 6C, 6C, . . . are supplied with electricity by the power source line, the LED modules 6*a*C, 6*a*C, . . . , for example, emit white light. Since the mounting step portions 10Cb, 10Cb, . . . of the unit mounting plate 10C to which the third optical units 6C, 6C, . . . are fixed are formed at angles of inclination α1 to α2 that incline downward towards the front F of the case main body 3, the white light is mainly irradiated towards the front F, that is, frontward in the road width direction.

In addition, since the angles of inclination α1 to α4 of the mounting step portions 10Cb, 10Cb, . . . gradually decrease towards the front F from the back B side, it is possible to reduce the occurrence of a situation in which light is blocked by the third optical units 6C, 6C, . . . that are adjacent to each other in the front-to-rear direction.

The third optical units 6C, 6C, . . . also irradiate white light emitted by the LED modules 6*a*C, 6*a*C, . . . in the longitudinal direction of the irregularly shaped lens 20, more specifically, the width (transverse) direction of the case main body 3, that is, the longitudinal direction of a road. However, because the arrangement of the third optical units 6C, 6C, . . . in the longitudinal direction of the road is staggered, it is possible to reduce the occurrence of a situation in which light is blocked by the third optical units 6C, 6C, . . . that are adjacent to each other in the longitudinal direction of the road.

Furthermore, as shown in FIG. 31, since a side face of the unit mounting plate 10C to which the plurality of third optical units 6C, 6C, . . . are mounted contacts against an inner face of the case main body 3, heat generated by the LED module 6*a*C of the third optical units 6C, 6C, can be conducted to the case main body 3 through the unit mounting plate 10C. Consequently, since heat can be released to the outside air from the outer surface of the case main body 3, it is possible to reduce the occurrence of a situation in which heat is confined inside the case main body 3 and the temperature thereof rises. As a result, a decrease in the luminous efficiency as well as a deterioration in the life span characteristics of the LED module 6*a*C due to heat can be mitigated.

In addition, while the third optical units 6C, 6C, that generate heat are arranged inside the case main body 3 on the lower side in FIG. 31 of the apparatus main body A, the power supply apparatus 24 that generates heat is arranged inside the top cover 4 on the upper side in FIG. 31 of the apparatus main body A. Thus, since the third optical units 6C, 6C, . . . and the power supply apparatus 24 are arranged so that there is a clearance therebetween in the vertical direction, an increase in the temperature of the case main body 3 can be reduced in comparison to a configuration in which the power supply apparatus 24 is arranged inside the case main body 3 together with the third optical units 6C, 6C, . . . .

Furthermore, if rain, snow, dirt, dust, dead leaves or the like fall onto the upper surface of the top cover 4, they are caused to slip off from the upper surface by the downward curved surface in the front-to-rear direction or the downward curved surface in the width direction of the top cover 4 as shown by the arrows in FIG. 3. Hence, the accumulation of rain, snow, dirt, dust, dead leaves or the like on the upper surface of the top cover 4 can be reduced. As a result, maintenance can be reduced.

In addition, since the surface area of the top cover 4 is increased by formation thereon of the pair of mountain-like protrusions 4*c* and 4*d* and the curved concave portion 4*e*, the heat dissipation properties thereof can be improved. Further, the heat dissipation properties can be enhanced by facilitating natural convection inside the light source chamber 3*c* within the top cover 4.

Although a case in which ten of the third optical units 6C, 6C, . . . are provided is described according to the above embodiment, the number of the third optical units 6C, 6C, . . . is not limited thereto, and the number of third optical units 6C, 6C, . . . may be more than ten or less than ten.

Further, since each third optical unit 6C is unitized by integrally assembling in advance the LED module 6*a*C, the ceramic substrate 6*b*C and the irregularly shaped lens 20, and is detachably provided on the unit mounting plate 10C that is arranged inside the case main body 3, each optical unit 6C can be individually replaced. Therefore, even if a malfunction occurs in some of the plurality of third optical units 6C, 6C, . . . , the costs can be reduced in comparison to replacing the entire lighting apparatus 1C.

Moreover, since the LED module 6*a*C is supported by the ceramic substrate 6*b*C that has excellent heat transfer properties, the heat dissipation properties with respect to heat generation of the LED module 6*a*C can be enhanced. Further, since the ceramic substrate 6*b*C that is generally fragile is adhered to the irregularly shaped lens 20 by means of a silicone resin without being screwed, damage of the ceramic substrate 6*b*C can be reduced.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A lighting apparatus, comprising:

an optical unit comprising a light emitting module that includes a light emitting element mounted on a substrate, and a lens configured to control distribution of light from the light emitting module;

a unit mounting plate, formed in a flat plate shape, comprising a front surface on which the optical unit is disposed;

a power supply apparatus comprising a lighting circuit configured to cause the light emitting element to light; and a body configured to comprise a case main body and a top cover being openably and closably provided with the case main body, the case main body having a coupling portion for connecting a support column to the case main body, a non-translucent portion having an irradiating opening provided at a bottom surface of the case main body through which the optical unit irradiates light, and a translucent plate formed in a flat plate shape, the flat plate-shaped translucent plate being arranged in parallel with the flat plate-shaped unit mounting plate and arranged so as to fit the irradiating opening such that the non-translucent portion surrounds an entire outer periphery of the translucent plate and such that the non-translucent portion and the translucent plate are substantially arranged in the same plane, wherein the optical units and the unit mounting plate are housed in the body such that the optical unit faces the irradiating opening.

2. The lighting apparatus according to claim 1, wherein:

the unit mounting plate comprises a flange provided at an outer peripheral edge of the unit mounting plate, and the flange is supported by the non-translucent portion as a peripheral area around the translucent plate such that the flat plate-shaped unit mounting plate is attached to and spaced from the irradiation opening of the body.

3. The lighting apparatus according to claim 1, wherein the translucent plate is transparent.

* * * * *